US011905749B2

(12) United States Patent
Benedetti et al.

(10) Patent No.: US 11,905,749 B2
(45) Date of Patent: Feb. 20, 2024

(54) HINGE FOR THE ROTATABLE MOVEMENT OF A DOOR OR SIMILAR CLOSING ELEMENT

(71) Applicant: Colcom Group S.p.A., Nave (IT)

(72) Inventors: Luca Benedetti, Nave (IT); Mihai Mesaros, Nave (IT)

( * ) Notice: Subject to any disclaimer, the term of this patent is extended or adjusted under 35 U.S.C. 154(b) by 933 days.

(21) Appl. No.: 16/472,864

(22) PCT Filed: Dec. 22, 2017

(86) PCT No.: PCT/IB2017/058360
§ 371 (c)(1),
(2) Date: Jul. 24, 2020

(87) PCT Pub. No.: WO2018/116275
PCT Pub. Date: Jun. 28, 2018

(65) Prior Publication Data

US 2022/0195770 A1 Jun. 23, 2022

(30) Foreign Application Priority Data

Dec. 23, 2016 (IT) ........................ 102016000130855
Dec. 23, 2016 (IT) ........................ 102016000130864
Dec. 23, 2016 (IT) ........................ 102016000130881
Dec. 23, 2016 (IT) ........................ 102016000130887
Dec. 23, 2016 (IT) ........................ 102016000130894

(51) Int. Cl.
*E05D 7/081* (2006.01)
*E05F 3/20* (2006.01)
(Continued)

(52) U.S. Cl.
CPC ........... *E05D 5/0246* (2013.01); *E05D 7/081* (2013.01); *E05F 3/104* (2013.01); *E05F 3/12* (2013.01); *E05F 3/20* (2013.01); *E05Y 2201/638* (2013.01); *E05Y 2800/12* (2013.01); *E05Y 2800/424* (2013.01)

(58) Field of Classification Search
CPC ..... E05F 3/10; E05F 3/104; E05F 3/12; E05F 3/20; E05D 5/0246
See application file for complete search history.

(56) References Cited

U.S. PATENT DOCUMENTS 882,721 A * 3/1908 Soss .......................... E05F 3/20 16/68
1,584,981 A * 5/1926 De Hon .................. E05F 3/108 16/52
(Continued)

FOREIGN PATENT DOCUMENTS

DE 102015015170 * 11/2015 ................ C05F 5/10
GB 15648 * 7/1911
(Continued)

*Primary Examiner* — Emily M Morgan
(74) *Attorney, Agent, or Firm* — Themis Law

(57) ABSTRACT

A hinge for the rotatable movement of a door or a similar closing element anchored to a wall or a similar stationary support includes a fixed element adapted to be coupled to the wall or a similar stationary support and a movable element adapted to be coupled to the door or a similar closing element. The fixed and movable elements are coupled to mutually rotate around a first longitudinal axis between an open position and a closed position.

5 Claims, 14 Drawing Sheets

(51) Int. Cl.
*E05F 3/12* (2006.01)
*E05D 5/02* (2006.01)
*E05F 3/10* (2006.01)

(56) References Cited

U.S. PATENT DOCUMENTS

| | | | | |
|---|---|---|---|---|
| 1,603,823 | A * | 10/1926 | Willard | E05F 1/1253<br>16/284 |
| 2,456,537 | A * | 12/1948 | Seaman | E05F 3/10<br>16/54 |
| 2,588,010 | A * | 3/1952 | Kennon | E05D 7/081<br>16/281 |
| 5,913,391 | A * | 6/1999 | Jeffries | F16F 9/34<br>188/316 |
| 6,151,753 | A * | 11/2000 | Salutzki | E05F 3/10<br>16/49 |
| 10,633,903 | B2 * | 4/2020 | Benedetti | E05D 5/10 |
| 2006/0021189 | A1 * | 2/2006 | Johnson | E05F 3/104<br>16/63 |
| 2012/0198654 | A1 * | 8/2012 | Reid | E05F 3/108<br>16/52 |
| 2017/0247922 | A1 * | 8/2017 | Wang | E05F 1/1091 |
| 2018/0266512 | A1 * | 9/2018 | Zimmer | F16J 15/002 |
| 2018/0283073 | A1 * | 10/2018 | Bacchetti | E05F 1/105 |
| 2021/0189782 | A1 * | 6/2021 | Benedetti | E05F 3/12 |
| 2021/0355730 | A1 * | 11/2021 | Miglioranzo | E05F 3/12 |

FOREIGN PATENT DOCUMENTS

| | | |
|---|---|---|
| GB | 191115648 | 5/1912 |
| WO | 2016185394 | 11/2016 |

* cited by examiner

HINGE FOR THE ROTATABLE MOVEMENT OF A DOOR OR SIMILAR CLOSING ELEMENT

FIELD OF THE INVENTION

The present invention generally regards the technical field of closing or control hinges, and it particularly regards a hinge for the rotatable movement of a door, a shutter or the like.

STATE OF THE ART

Hinges comprising a hinge body and a pin mutually coupled to allow a closing element, such as a door, a shutter or the like, to rotate between an open position and a closed position, are known.

In particular, the hinge body generally has large dimensions thus making the prior art hinges particularly cumbersome and aesthetically wanting. Such characteristic is particularly disadvantageous when the hinges are mounted on glass doors or shutters.

Thus, such hinges are susceptible to improvement, in particular as regards the aesthetic appeal and the overall dimensions thereof.

Furthermore, the generally known hinges comprise means for braking and/or damping the opening and/or the closing of the closing element.

Such hinges are susceptible to improvement, in particular as regards means for braking and/or damping the closing element.

SUMMARY OF THE INVENTION

An object of the present invention is to at least partly overcome the aforementioned drawbacks, by providing a hinge that is highly functional and inexpensive.

Another object of the invention is to provide a hinge with small overall dimensions.

Another object of the invention is to provide a hinge with high aesthetic appeal.

Another object of the invention is to provide a hinge capable of braking or damping the opening and/or closing of the closing element.

Another object of the invention is to provide a hinge that is extremely safe.

Another object of the invention is to provide a hinge that is extremely easy to mount.

Another object of the invention is to provide a hinge that is extremely highly durable over time.

These and other objects that will be more apparent hereinafter, are attained by a hinge according to what is described and/or claimed and/or illustrated herein.

In a first aspect, there may be provided a hydraulic hinge for the rotatable movement of a closing element, such as a door, a window, a shutter or the like, between at least one closing position and at least one opening position, the closing element being anchorable to a stationary support structure, such as a wall, a floor, a frame or the like, the hinge comprising:

- a fixed element anchorable to the stationary support structure;
- a movable element anchorable to the closing element, said fixed element and movable element being mutually coupled so that the latter rotates—with respect to the former—around a first longitudinal axis between an open and closed position;

wherein one of said fixed element and movable element includes at least one working chamber defining a second longitudinal axis, said at least one working chamber including at least one portion comprising:

- a plunger element slidable along said second axis, said plunger element being operatively coupled with the other of said fixed element and movable element so that the rotation of the movable element corresponds to the sliding of the former;
- a working fluid for hydraulically damping the movement of said movable element;

wherein said plunger element partitions said at least one portion of said at least one working chamber into at least two variable volume compartments placed in fluid communication with each other and preferably adjacent to each other;

wherein said plunger element includes at least one first duct and at least one second duct spaced apart and fluidically independent with respect to each other to fluidically connect said first compartment and said second compartment, and wherein said plunger element further includes means for adjusting the flow of the working fluid acting on at least one of said at least one first duct and at least one second duct to adjust the rotation speed of the closing element between the at least one closing position and the at least one opening position.

Preferably, in the aforementioned hinge, said adjustment means act on one of said at least one first duct and said at least one second duct, the hinge further comprising valve means operatively associated with the other of said at least one first duct and at least one second duct to selectively occlude the flowing of the working fluid therethrough.

Preferably, in the aforementioned hinge, said means for adjusting the flow of the working fluid comprise at least one adjustment screw inserted into said plunger element to selectively constrict the through-flow section of said at least one of said at least one first duct and at least one second duct.

Preferably, in the aforementioned hinge, said at least one first duct and at least one second duct are substantially parallel to each other and to said second axis, said at least one adjustment screw being transversely inserted into said plunger element with respect to said second axis.

Preferably, in the aforementioned hinge, said adjustment screw has a central portion arranged at said other of said at least one first duct and said at least one second duct and an end portion arranged at said one of said at least one first duct and said at least one second duct, said central portion being configured so as to maintain the through-flow section of said other of said at least one first duct and said at least one second duct substantially unvaried irrespective of the position respectively of said end portion and of said one of said at least one first duct and said at least one second duct.

Preferably, in the aforementioned hinge, said end portion of said adjustment screw is substantially conical or frustoconical, the central portion thereof having a peripheral groove.

Preferably, in the aforementioned hinge, said one of said fixed element and movable element includes a hinge body internally comprising said at least one working chamber, said hinge body comprising at least one through opening for placing said at least one working chamber in fluid communication with the external, said adjustment means being accessible from the external by an operator through said at least one through opening.

Preferably, in the aforementioned hinge, said adjustment screw has a manoeuvring end, said at least one through opening and said plunger element being mutually configured so as to allow an operator to access the manoeuvring end of said adjustment screw through said at least one through opening when the plunger element is in a predetermined position, preferably corresponding to one of the at least one position for closing and the at least one position for opening the closing element.

Preferably, in the aforementioned hinge, said plunger element includes at least one pair of hydraulic sealing elastomeric elements, said at least one through opening and said plunger element being mutually configured so that said at least one through opening is always interposed between said hydraulic sealing elastomeric elements irrespective of the axial position of said plunger element, so as to prevent the working fluid from leaking through the at least one through opening.

Preferably, in the aforementioned hinge, upon the occurrence of one of the opening or the closing of the closing element, the working fluid flows from one of said first compartment and second compartment to the other of said first compartment and second compartment, upon the occurrence the other of the opening or the closing of the closing element the working fluid flowing from the other of said the first compartment and second compartment to said one of said first compartment and second compartment.

In a further aspect, irrespective of the above, there may be provided a hydraulic hinge for the rotatable movement of a closing element, such as a door, a window, a shutter or the like, between at least one closing position and at least one opening position, the closing element being anchorable to a stationary support structure, such as a wall, a floor, a frame or the like, the hinge comprising:

- a fixed element anchorable to the stationary support structure;
- a movable element anchorable to the closing element, said fixed element and movable element being mutually coupled so that the latter rotates—with respect to the former—around a first longitudinal axis between an open and closed position;

wherein one of said fixed element and said movable element includes at least one working chamber defining a second longitudinal axis, said at least one working chamber being partitioned into at least one first half-chamber and at least one second half-chamber mutually separated by partitioning means which include at least one hydraulic sealing element so that the working fluid exclusively lies in one of said at least one first half-chamber and at least one second half-chamber, the other of said at least one first half-chamber and at least one second half-chamber including counteracting elastic means;

wherein said one of said at least one first half-chamber and at least one second half-chamber includes:

- a plunger element slidable along said second axis, said plunger element being operatively coupled with the other of said fixed element and movable element so that the rotation of the movable element corresponds to the sliding of the former;
- a working fluid for hydraulically damping the movement of said movable element;

wherein said plunger element partitions said one of said at least one first half-chamber and at least one second half-chamber into at least two variable volume compartments placed in fluid communication with each other and preferably adjacent to each other;

wherein said at least one hydraulic sealing element is slidably inserted into said a least one working chamber, said counteracting elastic means acting thereon to push it against said working fluid.

Preferably, in the aforementioned hinge, the inner wall of said at least one working chamber is free of axial abutment elements for said at least one hydraulic sealing element.

Preferably, in the aforementioned hinge, said at least one hydraulic sealing element is substantially disc-shaped with a maximum outer diameter substantially equal to or slightly larger than the inner diameter of said at least one working chamber.

Preferably, in the aforementioned hinge, said at least one hydraulic sealing element includes an elastomeric annular peripheral sealing element susceptible to come into contact with the inner wall of said at least one working chamber.

Preferably, in the aforementioned hinge, said at least one working chamber further comprises at least one shaft having a first end operatively coupled with said other of said fixed element and movable element and a second end operatively connected with said plunger element.

Preferably, in the aforementioned hinge, said other of said at least one first half-chamber and at least one second half-chamber is proximal to said first longitudinal axis, said one of said at least one first half-chamber and at least one second half-chamber being distal from said first longitudinal axis, said at least one shaft being arranged in said first half-chamber and said second half-chamber passing through said at least one hydraulic sealing element.

Preferably, in the aforementioned hinge, said elastic counteracting means include a spiral spring fitted onto said at least one shaft having a first end at contact with said at least one hydraulic sealing element and a second end at contact with an abutment wall operatively coupled with said at least one shaft.

Preferably, in the aforementioned hinge, said other of said fixed element and movable element includes cam means, said one of said fixed element and movable element including cam follower means integrally coupled with said plunger element by means of said at least one shaft, said cam follower means further including said abutment wall so that the interaction between said cam means and cam follower means simultaneously promotes the sliding of said plunger element along said second axis and the compression and/or the selective elastic return of said spiral spring.

Preferably, in the aforementioned hinge, upon the occurrence of one of the opening or the closing of the closing element, the working fluid flows from one of said first compartment and second compartment to the other of said first compartment and second compartment, upon occurrence of the other of the opening or the closing of the closing element the working fluid flowing from the other of said the first compartment and second compartment to said one of said first compartment and second compartment.

In a further aspect, irrespective of the above, there may be provided a hydraulic hinge for the rotatable movement of a closing element, such as a door, a window, a shutter or the like, between at least one closing position and at least one opening position, the closing element being anchorable to a stationary support structure, such as a wall, a floor, a frame or the like, the hinge comprising:

- a fixed element anchorable to the stationary support structure;
- a movable element anchorable to the closing element, said fixed element and said movable element being mutually coupled so that the latter rotates—with respect to the former—around a first longitudinal axis;

wherein one of said fixed element and movable element includes at least one working chamber defining a second longitudinal axis substantially perpendicular to said first axis, the other of said fixed element and movable element including a pin defining said first axis;

wherein said at least one working chamber comprises:

a working fluid for hydraulically damping the rotary movement of said movable element;

a plunger element slidable along said second axis between a first end-stroke position, corresponding to one of the at least one position for closing and the at least one position for opening the closing element, and a second end-stroke position, corresponding to the other of the at least one position for closing and the at least one position for opening the closing element;

wherein said pin includes cam means, said at least one working chamber further comprising cam follower means operatively connected with said plunger element, said cam means and cam follower means being operatively coupled so that the sliding of the plunger element corresponds to the rotation of the movable element;

wherein one of said cam means and cam follower means comprises a working wall having at least one first working surface and at least one second working surface angularly spaced with respect to each other, the other of said cam means and cam follower means including an abutment element with an operative face susceptible to interact with said at least one first working surface when said plunger element is in one of said first and second end-stroke positions and interact with said at least one second working surface when said plunger element is in the other of said first and second end-stroke positions, said cam means and said cam follower means further including means for the mutual mechanical connection so that the rotary movement of the closing element is controlled by the working fluid even in case of unwanted pushing on the closing element during opening and/or closing.

Preferably, in the aforementioned hinge, one of said abutment element and said working wall includes a hook element susceptible to hook a hook portion of the other of said abutment element and said working wall during the mutual rotation of said fixed element and movable element around said first axis, said mutual mechanical coupling means including said hook element and said hook portion.

Preferably, in the aforementioned hinge, during the mutual rotation of said fixed element and movable element, said hook element and said hook portion are susceptible to move between a mutual decoupling position and a stable coupling position passing through a mutual start coupling position.

Preferably, in the aforementioned hinge, in said mutual decoupling position said second working surface and said operative face interact mutually and in said stable coupling position said first working surface and said operative face interact mutually, said first working surface, said second working surface and said operative face being mutually spaced apart in said start coupling position.

Preferably, in the aforementioned hinge, said working wall includes a third working surface interposed between said at least one first working surface and at least one second working surface, said third working surface being susceptible to interact with said operative face in said start coupling position.

Preferably, in the aforementioned hinge said abutment element includes said hook element, the latter extending from said operative face, said working wall including said hook portion, the latter including a fourth working surface opposite to said first working surface.

Preferably, in the aforementioned hinge, said hook element includes a first appendage extending substantially perpendicularly from said operative wall, said hook element further including a second appendage extending substantially perpendicularly from said first appendage to be faced to said operative face.

Preferably, in the aforementioned hinge, in said stable coupling position said first appendage interacts with said second working surface and said second appendage is faced to said fourth working surface, in said start coupling position said first appendage being faced to said second working surface and said second appendage interacting with said fourth working surface.

Preferably, in the aforementioned hinge, said first and second working surface and said operative face are substantially flat, the mutual interaction occurring by contact.

Preferably, in the aforementioned hinge, said first and second working surfaces are substantially perpendicular so that when said first working surface and said operative face are in mutual contact, said operative face and said second working surface are substantially perpendicular, and so that when said second working surface and said operative face are in mutual contact, said operative face and said first working surface are substantially perpendicular.

In a further aspect, irrespective of the above, there may be provided a hydraulic hinge for the rotatable movement of a closing element, such as a door, a window, a shutter or the like, between at least one closing position and at least one opening position, the closing element being anchorable to a stationary support structure, such as a wall, a floor, a frame or the like, the hinge comprising:

a fixed element anchorable to the stationary support structure;

a movable element anchorable to the closing element, said fixed element and movable element being mutually coupled so that the latter rotates—with respect to the former—around a first longitudinal axis between an open and closed position;

wherein one of said fixed element and movable element includes at least one working chamber defining a second longitudinal axis, said at least one working chamber including:

a plunger element slidable along said second axis operatively coupled with the other of said fixed element and movable element so that the sliding of the former corresponds to the rotation of the movable element, said plunger element at least partially partitioning said at least one working chamber into at least two variable volume compartments placed in fluid communication with each other and preferably adjacent to each other;

a working fluid for hydraulically damping the movement of said movable element;

valve means for controlling the working fluid flow between said first compartment and said second compartment;

wherein said valve means include an operative chamber having at least one port for the through-flow of the working fluid, said valve means further including a obstructer movable in said operative chamber for selectively closing/opening said at least one through-flow port, said operative chamber including at least one fixed portion and at least one movable portion which includes said at least one through-flow port, said valve means (50) further including counteracting elastic means for normally pushing the movable portion of said operative chamber against the fixed portion, said counteracting elastic means being configured to be compressed when the pressure in said at least one operative chamber exceeds a predetermined threshold value, so as to the allow the through-flow of the working fluid in the interspace between said fixed and movable portions of said operative chamber even when at least one said through-flow port is closed.

Preferably, in the aforementioned hinge, the movable portion of said operative chamber is slidable along said second axis or an axis substantially parallel thereto between an engagement position wherein it is mutually sealingly engaged with the fixed portion of said operative chamber and a disengagement position wherein it is mutually spaced apart from the latter to define said interspace.

Preferably, in the aforementioned hinge, said threshold value is calibrated so as to prevent the unhinging of the closing element by a user who forces the opening and/or the closing thereof.

Preferably, in the aforementioned hinge, the movable portion of said operative chamber includes a first substantially conical or frusto-conical engagement surface, the fixed portion of said operative chamber including a second substantially conical or frusto-conical engagement surface susceptible to be sealingly engaged with said first engagement surface when the movable portion of said operative chamber is forced against the fixed portion by said counteracting elastic means.

Preferably, in the aforementioned hinge, said at least one through-flow port is arranged at the constricted end of said first substantially conical or frusto-conical engagement surface, the movable portion of said operative chamber including a seat opposite to said constricted end for receiving said counteracting elastic means.

Preferably, in the aforementioned hinge, the fixed portion of said operative chamber includes a cylindrical wall extending along said second axis to slidably guide the movable portion of said operative chamber.

Preferably, in the aforementioned hinge, upon the occurrence of one of the opening or the closing of the closing element, the working fluid flows from one of said first compartment and second compartment to the other of said first compartment and second compartment through said valve means, there also being provided for a hydraulic circuit to allow the back-flow of the working fluid from the other of said first compartment and second compartment to said one of said first compartment and second compartment.

Preferably, in the aforementioned hinge, when the pressure in said at least one operative chamber is equal to or below said threshold value, the working fluid back-flows towards said one of said first compartment and said second compartment through said hydraulic circuit, when the pressure in said at least one operative chamber exceeds said threshold value, the working fluid back-flowing towards said one of said first compartment and second compartment through said hydraulic circuit and said interspace.

Preferably, in the aforementioned hinge said at least one working chamber further comprises at least one shaft having a first end operatively coupled with said other of said fixed element and movable element and a second end operatively connected with said plunger element.

Preferably, in the aforementioned hinge, said other of said fixed element and said movable element includes cam means, said one of said fixed element and mobile element including cam follower means integrally coupled with said plunger element by means of said at least one shaft.

In a further aspect, irrespective of the above, there may be provided a system for fixing a glass door or shutter defining a first plane (π) to a stationary support structure, such as a wall, a frame or a floor, comprising:

at least one hinge movable between a position for opening and a position for closing the glass door or shutter;

at least one first plate-shaped fixing element and a second plate-shaped fixing element mutually cooperating to fix the glass door or shutter;

wherein said at least one hinge comprises a substantially box-shaped hinge body, the latter and one of said at least one first and at least one second plate-shaped fixing element including means for the mutual removable coupling so as to define a unitary assembly defining a second plane, said unitary assembly and the other of said at least one first and at least one second plate-shaped fixing element cooperating to fix—on opposite sides—the glass door or shutter so that said first and said second plane are substantially parallel or coincident.

Preferably, in the aforementioned system, said hinge body defines a first axis, the hinge further comprising a pin defining a second axis substantially perpendicular to the first axis, said hinge body and said pin being rotationally coupled to rotate around said second axis between said opening and closing positions.

Preferably, in the aforementioned system, said at least one hinge is dimensioned so that when said hinge body and said one of said at least one first and one second plate-shaped fixing element are mutually decoupled, the at least one hinge is concealably insertable within the tubular frame of a double glazing or a glass shutter.

Preferably, in the aforementioned system, said removable mutual coupling means include a connecting plate made of a single piece with said one of said at least one first and at least one second plate-shaped fixing element so as to define a unitary connecting accessory, said removable mutual coupling means further including screw-and-nut means for the mutual removable fixing of said connecting plate and said hinge body.

Preferably, in the aforementioned system, said screw and nut screw means act in a direction substantially perpendicular to said first axis.

Preferably, in the aforementioned system, said connecting plate and said one of said at least one first and at least one second plate-shaped fixing element are substantially perpendicular to each other.

Preferably, in the aforementioned system, said box-shaped hinge body includes an upper surface designated to be faced to the lower surface of said connecting plate when said box-shaped hinge body and said one of said at least one first and at least one second plate-shaped fixing element are mutually coupled, said lower surfaces of said connecting plate and upper surface of said box-shaped hinge body being substantially coextensive.

Preferably, in the aforementioned system, said removable mutual coupling means further include a longitudinal appendage extending from said lower surface of said connecting plate insertable in a corresponding longitudinal seat of the upper surface of said box-shaped hinge body.

Preferably, in the aforementioned system, said longitudinal appendage and said longitudinal seat are mutually counter-shaped so as to further act as mutual means for centring said box-shaped hinge body and said connecting plate.

Preferably, in the aforementioned system, said longitudinal appendage and said longitudinal seat are substantially parallel to each other and to said first axis.

Advantageous embodiments of the invention are defined according to the dependent claims.

BRIEF DESCRIPTION OF THE DRAWINGS

Further characteristics and advantages of the invention will be more apparent in light of the detailed description of some preferred but non-exclusive embodiments of the invention, illustrated by way of non-limiting example with reference to the attached drawings, wherein.

DETAILED DESCRIPTION OF SOME PREFERRED EMBODIMENTS

Figure 1:
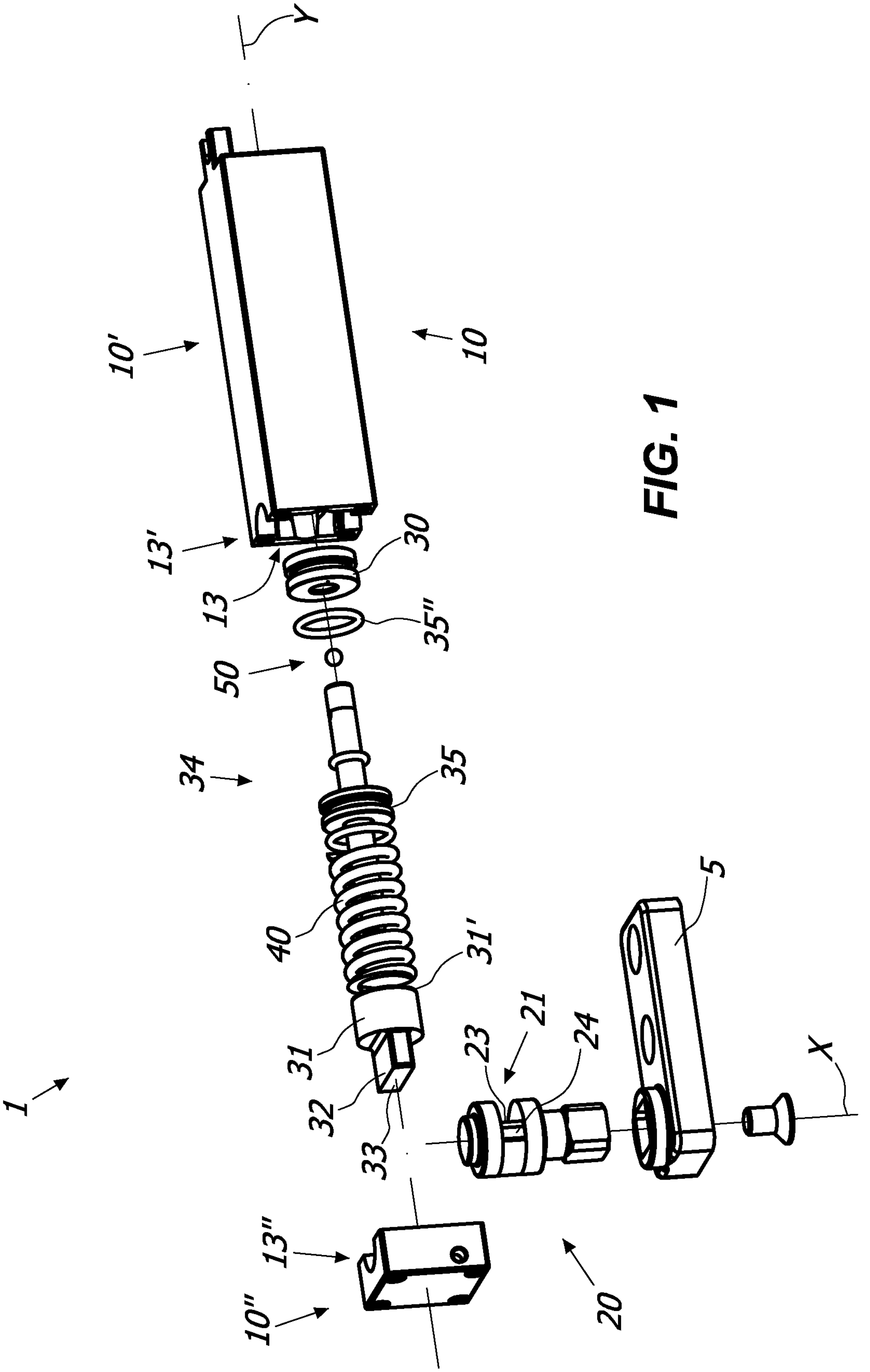
FIG. 1 is an exploded view of an embodiment of the hinge 1.

With reference to the aforementioned figures, the hinge according to the invention, indicated in its entirety with reference number 1, will be advantageously applicable for glass doors or shutters, such as for example those of a display window or display case.

The hinge 1 is suitable to rotatably couple a stationary support structure, for example a frame S, and a closing element, for example a shutter D, rotatably movable between an opening position and a closing position around a rotation axis X.

It should be observed that even though hereinafter reference shall be made to the frame S and the shutter D, the hinge 1 is applicable to any stationary support structure and any closing element without departing from the scope of protection of the attached claims.

The hinge 1 shall suitably include a substantially box-shaped hinge body 10 and a pin 20 defining the rotation axis X.

In a preferred but non-exclusive embodiment, the hinge body 10 may be anchored to the shutter D and the pin 20 to the frame S, for example by means of the base 5. In this case, the fixed element will include a pin 20, while the movable element may include the hinge body 10.

Vice versa, in an embodiment of the invention not illustrated in the attached drawings, the hinge body 10 may be anchored to the frame S, while the pin 20 may be anchored to the shutter D, without departing from the scope of protection of the attached claims. In this case, the fixed element will include the hinge body 10, while the movable element may include the pin 20.

Furthermore, it will be clear that the hinge 1 must not necessarily include a pin 20, given that the presence of an operative connection between the fixed and movable elements is sufficient.

Advantageously, the hinge body 10 and the pin 20 may be mutually coupled to rotate around the axis X between the shutter open and closed positions D.

More in particular, the pin 20 may be inserted into a substantially cylindrical seat 14 passing through the hinge body 10 having an axis coincident with the axis X.

Preferably, the hinge body 10 may be obtained according to the disclosures provided for by the Italian patent application number 102016000049176, on behalf of the Applicant. In this case, the hinge body 10 is obtained in two parts 10' and 10" that can be coupled to each other to obtain the substantially cylindrical seat 13. Thus, the latter is also obtained in two parts 13' and 13".

In a preferred but non-exclusive embodiment, the hinge body 10 may be configured to rotate around the axis X between a closed position and at least two open positions opposite with respect to the closed position. In other words, the hinge 1 may be ambidextrous, i.e. it can be used on doors or shutters opening to the right and on doors or shutters opening to the left.

The pin 20 may suitably include a cam element 21 integrally joined thereto using a plunger element 30 slidable along an axis Y.

The sliding axis Y of the plunger element 30 may be substantially perpendicular to the axis X. Furthermore, the rotation axis X of the shutter D may be substantially vertical.

In any case, the plunger element 30, which may be operatively connected with a cylinder 31 by means of a shaft 34, may slide in a working chamber 11 within the hinge body 10 between a retracted end-stroke position proximal to the bottom wall 12 of the working chamber 11, and an extended end-stroke position distal with respect thereto.

Such retracted and extended end-stroke positions may suitably vary, and not necessarily corresponding to the maximum distal and/or proximal position that can be taken by the plunger element 30.

In a preferred but non-exclusive embodiment of the invention, the working chamber 11 may include elastic counteracting means acting on the plunger element 30.

In a preferred but non-exclusive embodiment, the elastic counteracting means may include, respectively may consist in, a spiral spring 40 with predetermined diameter.

Depending on the configuration, the elastic counteracting means 40 may be thrust or recovery means.

In the case of thrust elastic counteracting means, the force thereof must be such to automatically return the shutter D from the open or closed position that it reaches when the plunger element 30 is in proximal position towards the other of the open or closed positions that it reaches when the plunger element 30 is in distal position.

In this case, depending on whether the position reached by the shutter D when the plunger element 30 is in proximal position is open or closed, the hinge 1 will be an opening hinge or a closing hinge or a door closer hinge.

In the case of recovery elastic counteracting means instead, the force thereof must be such not to be able to push the shutter D from the open or closed position that it reaches when the plunger element 30 is in proximal position towards the other of the open or closed position that it reaches when the plunger element 30 is in distal position. In this case, the shutter D must be moved manually or however using external actuator means with respect to the hinge 1, for example a motor.

However, the force of the recovery elastic means, must be such to return the plunger element 30 from the proximal position to the distal position.

In this case, depending on whether the position reached by the shutter D when cylinder 31 is in proximal position is open or closed, the hinge 1 will be an opening or closing control hinge.

It is clear that the opening or closing hinge will also be used for opening or closing control purposes too, whereas the contrary is untrue.

It is clear that even though the attached figures illustrate a closing hinge 1, the latter may be a closing or opening hinge, just as it could be an opening or closing control without departing from the scope of protection of the attached claims.

The cam element 21 of the pin 20 may suitably interact with the cam follower means of the cylinder 31 to displace the latter between the distal position and the proximal position.

In a first preferred but non-exclusive embodiment, illustrated in FIG. 1, the cam element 21 of the pin 20 may have a first working surface 23 susceptible to come into contract with the operative face 33 of the cylinder 31 when the same is in distal position and a second working surface 24 susceptible to come into contact with the operative face 33 of the cylinder 31 when the same is in proximal position.

More precisely, the cylinder 31 includes a plate-shaped appendage 32, which in turn includes the operative face 33.

Advantageously, both the two working surfaces 23 and 24 and the operative face 33 may be substantially flat or slightly curved, and the mutual engagement may be for contact purposes.

The angle between the two working surfaces 23 and 24 may vary, and it will determine the opening angle of the shutter D. The two surfaces 23 and 24 may suitably be substantially perpendicular to each other.

In another embodiment, illustrated for example in FIGS. 9 to 12B, the cam element 21 may be configured as a substantially parallelepiped-shaped working wall, with working surfaces 23' and 24' substantially perpendicular to each other.

Figure 12A:
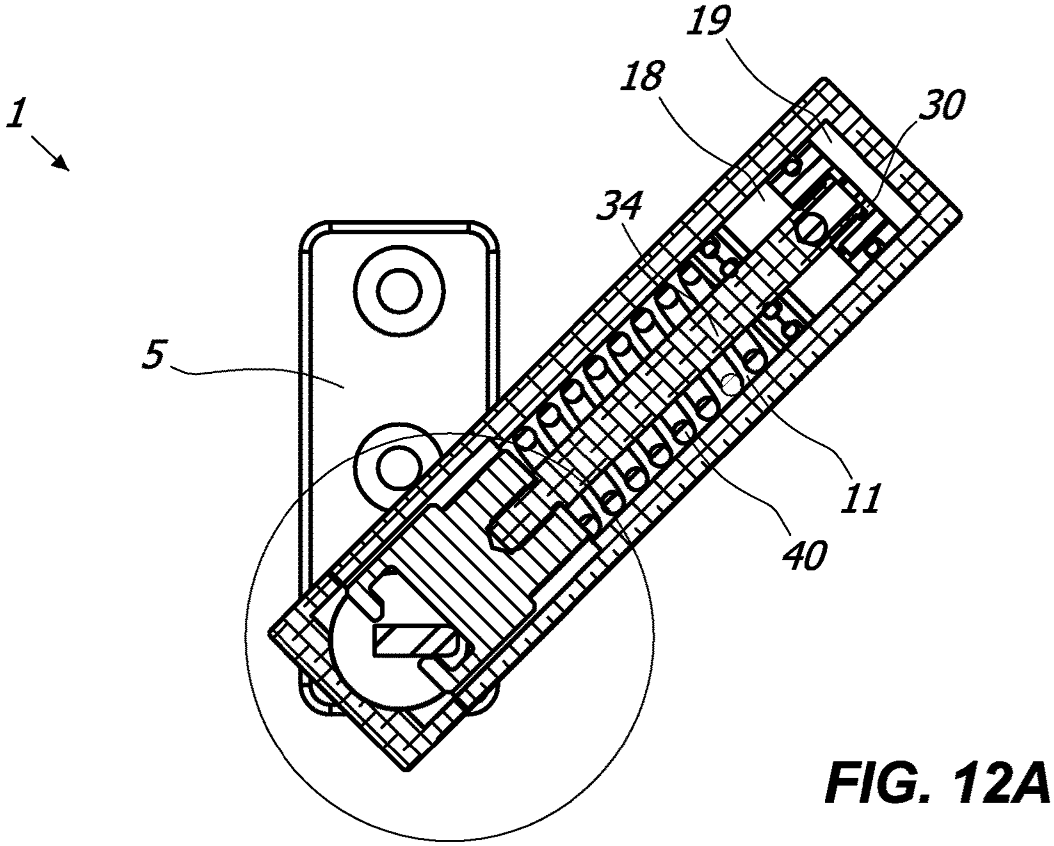
Figure 11B:
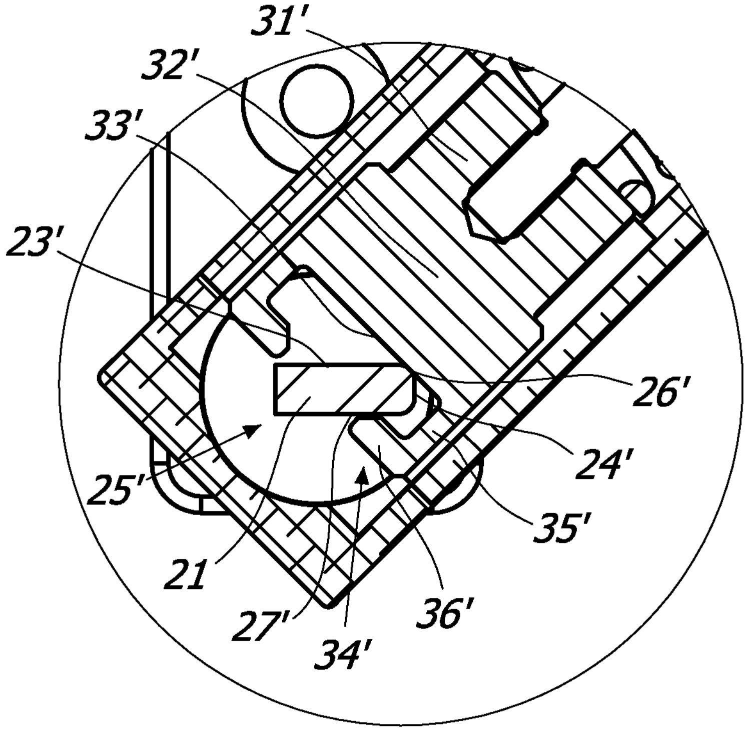
Figure 12B:
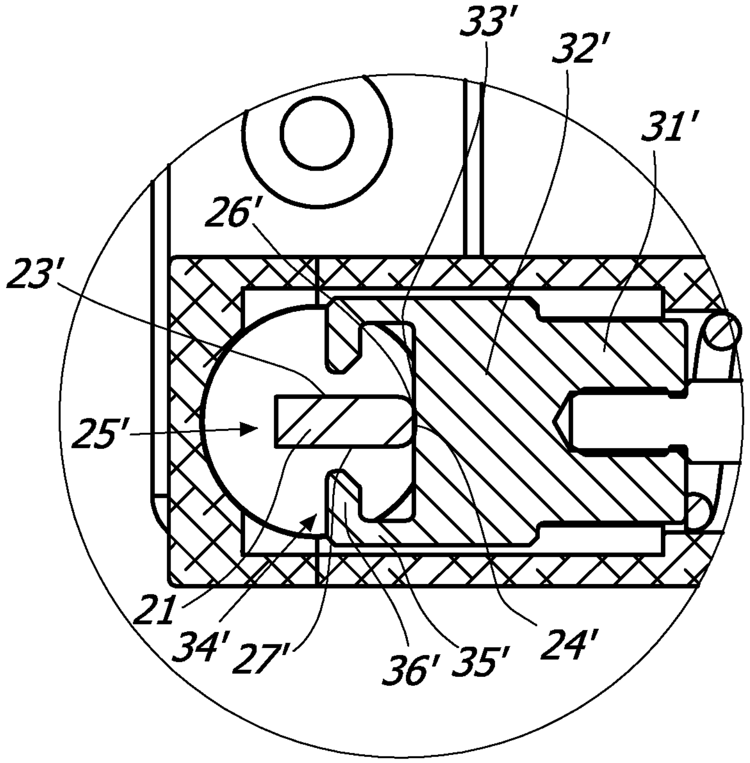

On the other hand, the cylinder 31 may include an abutment element 32' with an operative face 33' susceptible to coming into contact with the working surface 23' when the shutter D is in closed position (FIG. 10A) and with the working surface 24' when the shutter D is in open position (FIG. 12A).

The cam element 21 and the abutment element 32' may be mechanically connected to each other. This allows the maximum control of the movement of the shutter D, both in the opening and closing mode.

In particular, in case of a hydraulic hinge, the aforementioned mechanical connection allows the control of the movement of the shutter D even in case of undesired pushing to open and/or close.

In a preferred but non-exclusive embodiment, the aforementioned mechanical connection may occur through a hook element 34' extending from the operative face 33' of the abutment element 32', which hooks a hook portion 25' of the working wall 21 during the rotation of the shutter D.

The hook element 34' may include a first appendage 35' substantially extending perpendicularly from the operative face 33' and a second appendage 36' substantially extending perpendicularly from the first appendage 35' to remain facing the operative face 33'.

Figure 11A:
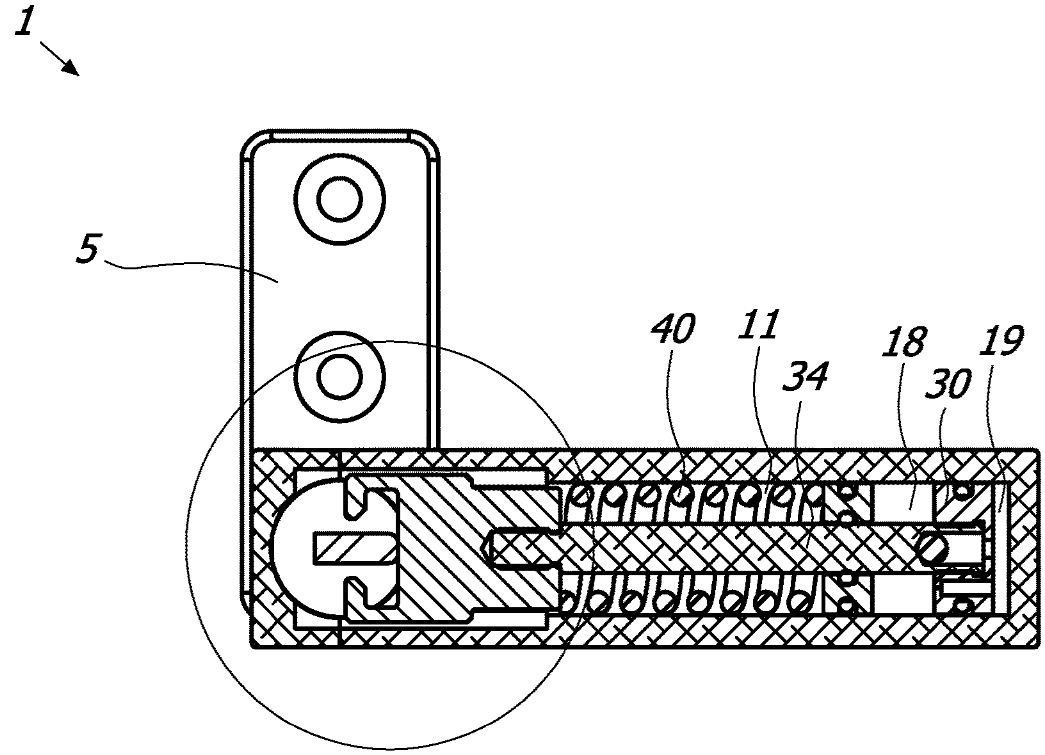

As particularly illustrated in FIGS. 10B to 12B, during the rotation of the shutter D the hook element 34' and the hook portion 25' may move between a mutual decoupling position (open position of the shutter D, FIG. 12A) and a stable coupling position (closed position of the shutter D, FIG. 10A) passing through a mutual start coupling position (FIG. 11A).

More precisely, in the mutual decoupling position (FIG. 12A) the working surface 24' and the operative face 33' may be at contact with each other, while the working surface 23' and the operative face 33' may be spaced apart.

In the stable coupling position (FIG. 10A), vice versa, the working surface 23' and the operative face 33' may be at contact with each other, while the working surface 24' and the operative face 33' may be spaced apart.

In such position, the first appendage 35' of the hook element 34' may be at contact with the second operative surface 24' and the second appendage 36' may be faced to the working surface 27'.

Then, in the start coupling position (FIG. 11A), the working surface 23', the working surface 24' and the operative face 33' may be mutually spaced apart. In such position, the operative face 33' may be at contact with the edge 26'.

In such position, the appendage 35' may be faced to the working surface 24' and the second appendage may come into contact with the working surface 27'.

It is clear that even though the hook element 34' has been described as part of the cam follower means and the working wall 21 as part of the cam means, the opposite can also apply without departing from the scope of protection of the attached claims.

FIGS. 15A to 16B illustrate a possible further mechanical coupling between the cam means 21 and cam follower means 32', wherein the latter include a slot 320, preferably a linear slot, and the former include a slider pin 210 slidably inserted thereinto.

The working chamber 11 may preferably include a working fluid, for example oil, for hydraulically damping the rotary movement of the shutter D.

In a preferred but non-exclusive embodiment, the working chamber 11 may be partitioned into two half-chambers 14 and 15, separated from each other by means of a hydraulic sealing element 35, for example a lip seal with relative O-ring, so that the working fluid exclusively lies in the half-chamber 15.

More generally, the hydraulic sealing element 35 may be substantially disc-shaped with a maximum outer diameter substantially equal to or larger than the inner diameter of the working chamber 11. The hydraulic sealing element 35 may include an elastomeric annular peripheral sealing element 35", for example an O-ring, designated to come into contact with the inner wall of the working chamber 11.

The shaft 34 for connection between the plunger element 30 and the cylinder 31 may suitably be arranged in both half-chambers 14 and 15, passing through the hydraulic sealing element 35.

Thus, the half-chamber 15 will be a hydraulic half-chamber, while the half-chamber 14 will be the mechanical half-chamber, free of hydraulic damping means. The spring 40 may be housed in the half-chamber 14. More in particular, the spring 40 may be interposed between the hydraulic sealing element 35 and an abutment wall 31' of the cylinder 31, at contact with both.

The half-chamber 15 may slidably house the plunger element 30, which may slide between the position distal from and the position proximal to the bottom wall 12.

The plunger element 30 may partition the half-chamber 15 into two variable volume compartments 18, 19 placed in fluid communication with each other and adjacent to each other. More in particular, the working fluid flows from the compartment 19 to the compartment 18 upon opening the shutter D, while the working fluid back-flows from the compartment 18 to the compartment 19 upon closing the shutter D.

Depending on the configuration of the plunger element 30, the working fluid may pass through it or through an external circuit.

Figure 2A:
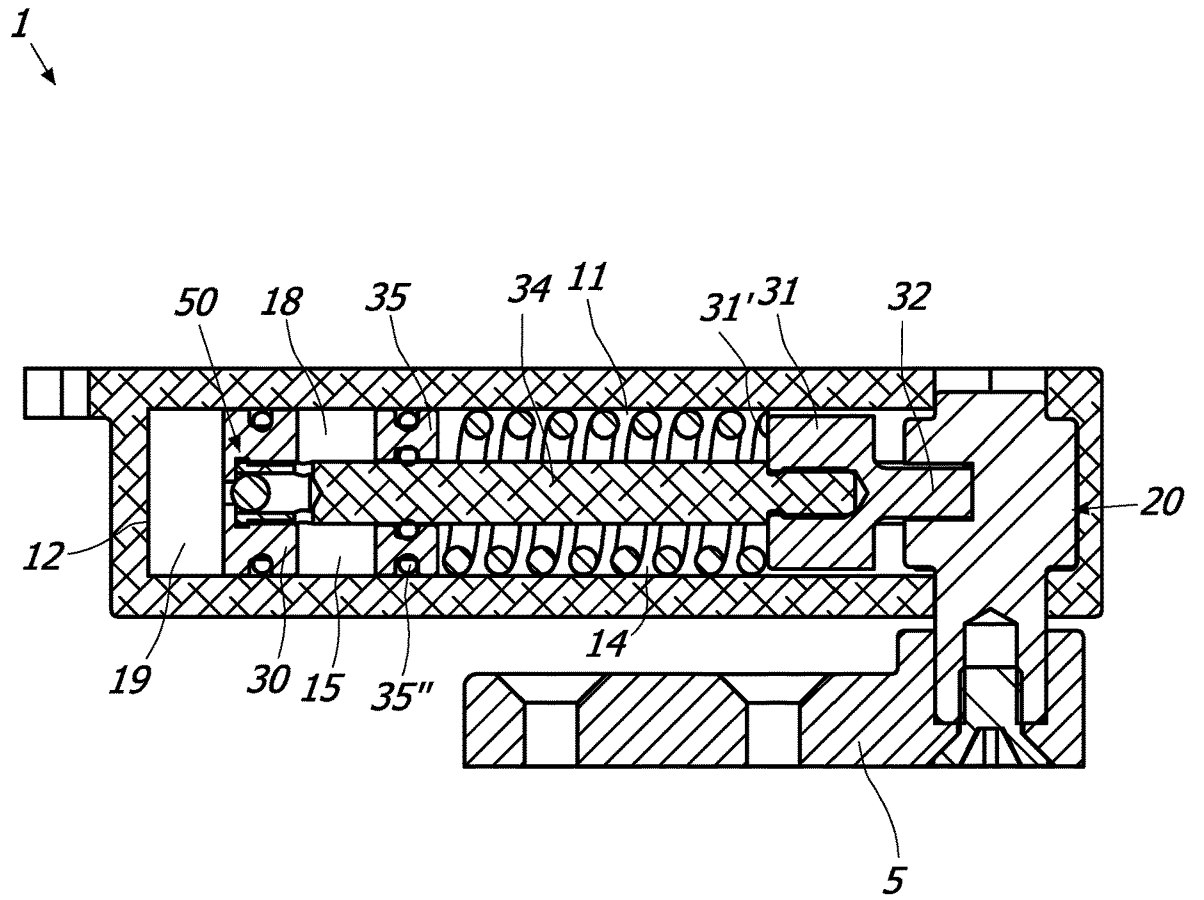
FIG. 2A is a sectional view of the embodiment of the hinge 1 of FIG. 1, with FIG. 2B showing some enlarged details.
Figure 2B:
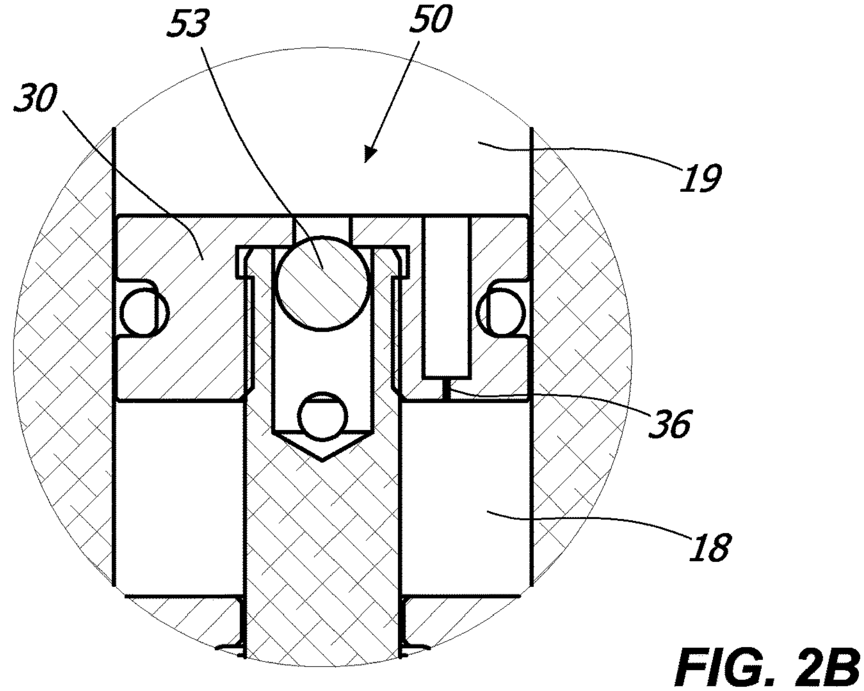

In the embodiment of FIGS. 1 to 2B, for example, during the opening of the shutter D the working fluid may flow through the valve means 50, while during the closing of the shutter D the working fluid may flow through the calibrated hole 36, which for example may be obtained as disclosed by patent number 102016000049206, on behalf of the Applicant.

Figure 3:
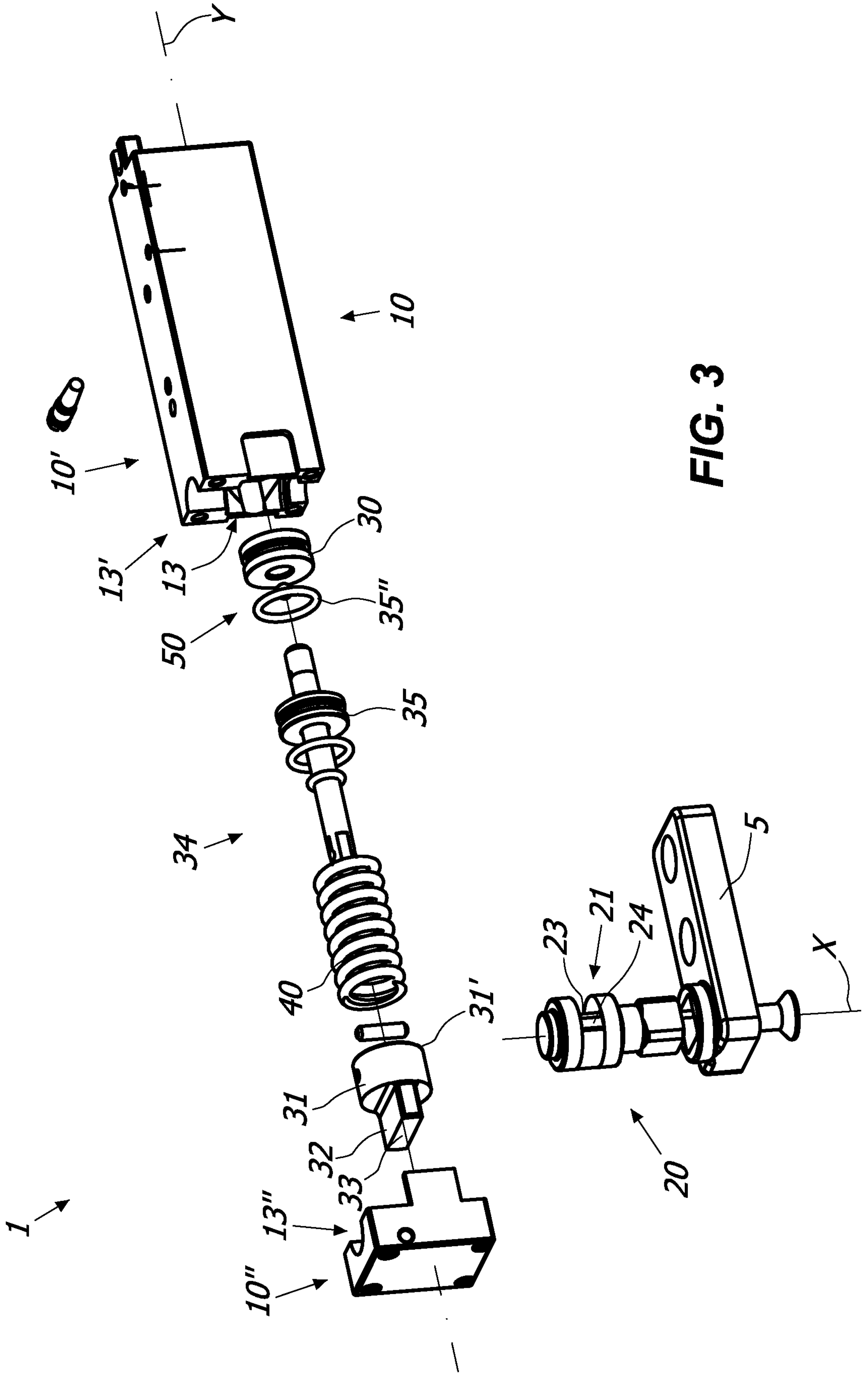
FIG. 3 is an exploded view of another embodiment of the hinge 1.

Furthermore, in the embodiment of FIG. 3, during the opening of the shutter D the working fluid may flow through the valve means 50, while during the closing of the shutter D the fluid may flow through a hydraulic circuit obtained, in a per se known fashion, in the hinge body 10.

Figure 4:
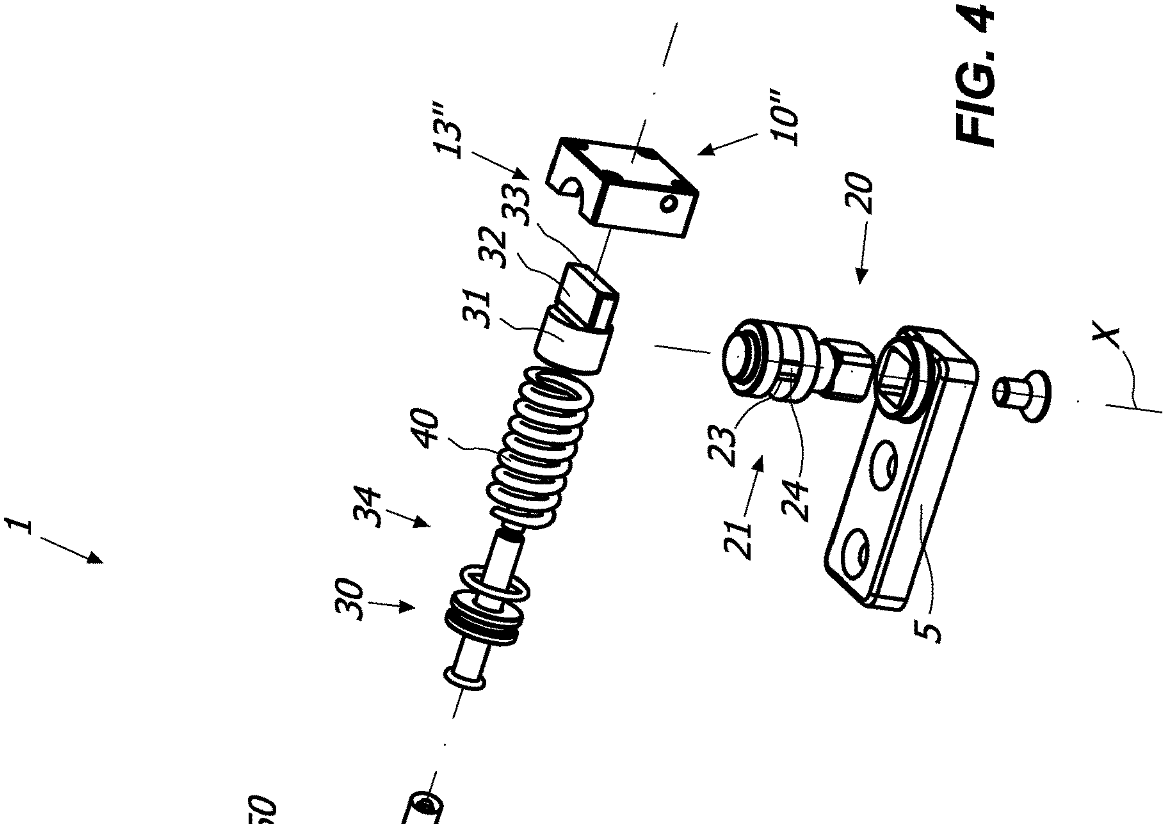
FIG. 4 is an exploded view of a further embodiment of the hinge 1.
Figure 4:
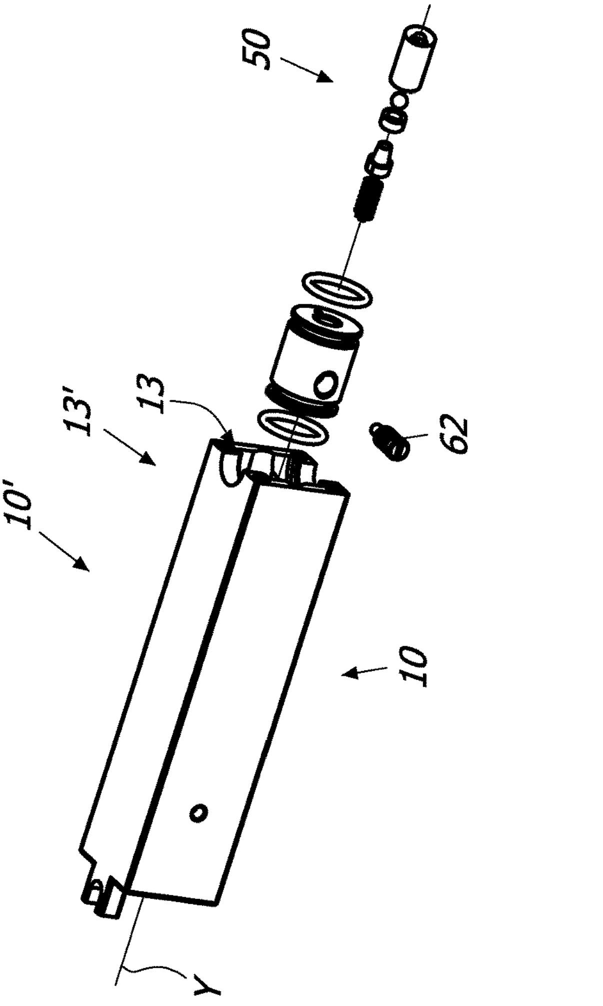
Figure 5A:
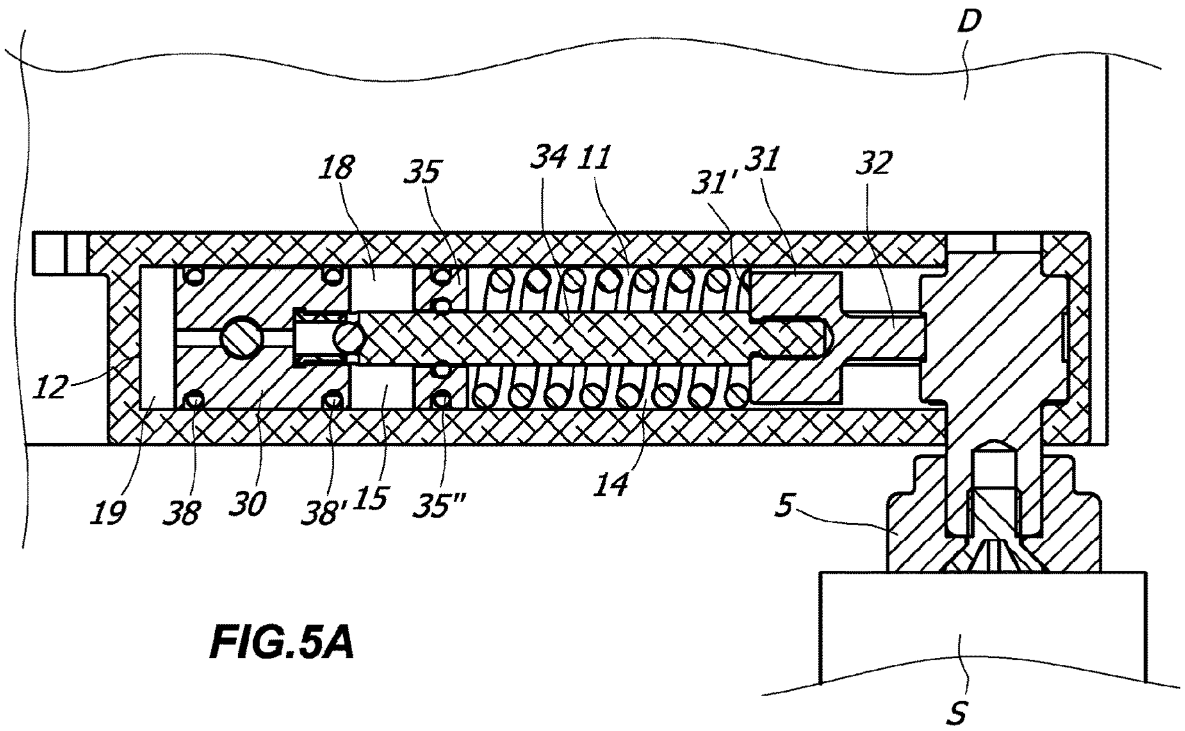
FIGS. 5*a* and 5*b* are sectional views of the embodiment of the hinge 1 of FIG. 4.
Figure 5B:
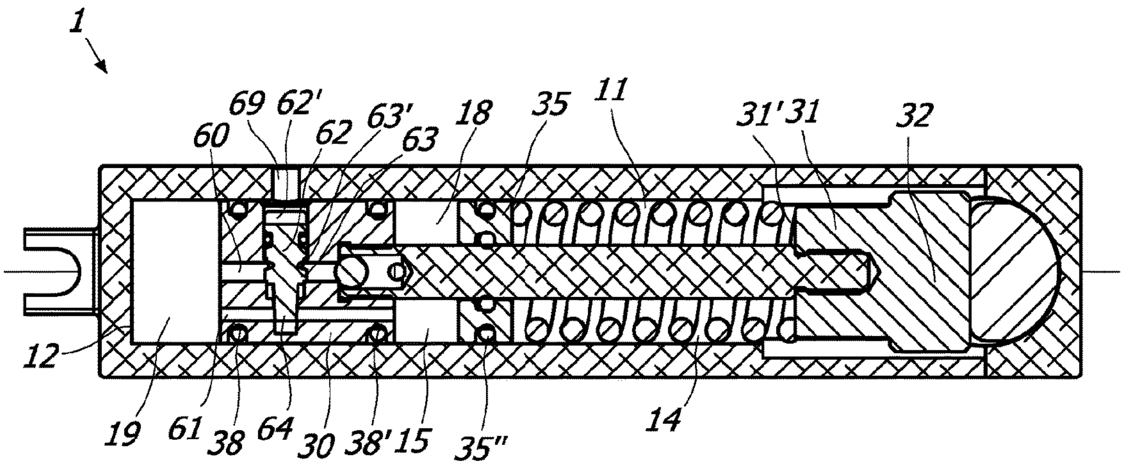

Furthermore, in the embodiment of FIGS. 4 to 5B, during the opening of the shutter D the working fluid may flow through the valve means 50, while during the closing of the shutter D the working fluid may flow through a hydraulic circuit obtained in the plunger element 30.

The hydraulic sealing element 35 may advantageously be slidably inserted into the working chamber 11, with the spring 40 acting thereon to push it against the working fluid.

Thus, the hinge will be extremely easy to manufacture and mount. As a matter of fact, the working chamber 11 may have a single diameter and it may be partitioned into the two half-chambers 14 and 15 simply by means of the hydraulic sealing element 35. The inner wall of the working chamber 11 may be free of elements for abutting against the hydraulic sealing element 35, which will exclusively act against the head of the working fluid.

In a preferred but non-exclusive embodiment, illustrated in particular in FIGS. 4 to 5B, the plunger element 30 may include a pair of ducts 60, 61 spaced apart and fluidically independent from each other to place the compartments 18 and 19 in fluid communication. The ducts 61, 62 may suitably be substantially parallel to each other and to the axis Y.

In particular, the plunger element 30 may be sealingly inserted into the working chamber 11, for example by means of a pair of O-rings 38, 38' so as to force the working fluid to flow through the ducts 60, 61.

An adjustment screw 62 acting on the ducts 60, 61 to adjust the rotation speed of the shutter D between the closing and opening positions may be transversely inserted into the plunger element 30.

For example, the adjustment screw 62 may be inserted into the plunger 30 transversely with respect to the axis Y and it may have an end portion 64 arranged at the duct 61 for selectively constricting the through-flow section thereof.

To this end, the end portion 64 of the adjustment screw 62 may be substantially conical or frusto-conical, same case applying to the seat in which the adjustment screw 62 may be inserted.

In particular, the screwing/unscrewing thereof may increase or reduce the through-flow section of the duct 61 so as to adjust the flow of the working fluid through the duct.

The hinge body 10 may suitably comprise at least one through opening 69 for placing the working chamber 11 in communication with the external. In particular, the plunger element 30 and the through opening 69 may be aligned at a predetermined position of the plunger element 30 which may correspond, for example, to the closed position of the shutter D.

Thus, in such predetermined position, the adjustment screw 62 may have a manoeuvring end 62' which may be accessible from the external by an operator through such through opening 69.

The latter and the plunger element 30 may suitably be configured so that the through opening 69 is always interposed between the pair of O-rings 38, 38' so as to prevent the working fluid from leaking through it.

On the other hand, the adjustment screw 62 may also comprise a central portion 63 arranged at the duct 60 which may be configured so as to maintain the through-flow section of the duct 60 substantially unvaried irrespective of the relative position between the end portion 64 and the duct 61. To this end, the central portion 63 thereof may have a peripheral groove 63'.

It is clear that the plunger element 30 may comprise even more than two ducts 60, 61, just like the adjustment screw 62 may also act on only one of the ducts 60, 61, without departing from the scope of protection of the attached claims.

The valve means 50 may be suitable to control the flow of the working fluid between the compartments 18 and 19, and they may include an operative chamber 51 having a working fluid inlet port 52' and discharge port 52".

Figure 8A:
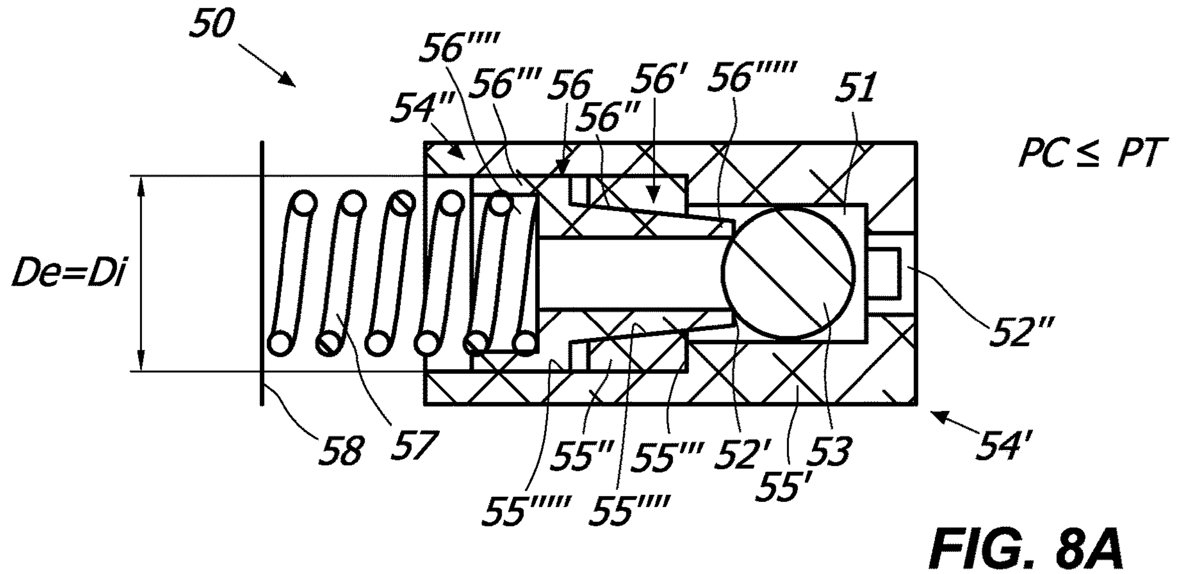
FIGS. 8A, 8B and 8C are enlarged sectional views of some details of the embodiment of the hinge 1 of FIG. 7.
Figure 8B:
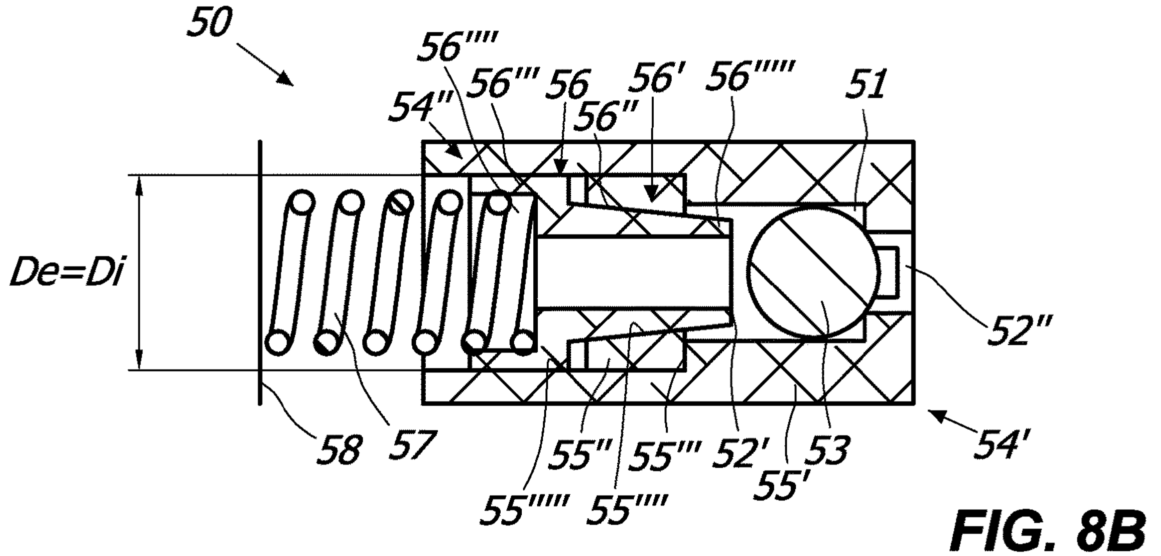

An obstructer 53, for example of the spherical type, may slidably slide in the operative chamber 51 for selectively closing/opening the inlet port 52', while the discharge port 52" may be configured to always allow the through-flow of the working fluid, in a per se known manner. It is clear that when the obstructer 53 rests against the inlet port 52' (FIG. 8A) it prevents the working fluid from flowing through the operative chamber 51 and that when the obstructer 53 is instead spaced apart from the inlet port 52' (FIG. 8B) the working fluid flows through the operative chamber 51 and it is discharged through the discharge port 52".

Even though hereinafter the ports 52' and 52" will respectively be described as inlet and discharge ports, it is clear that they may also serve the opposite purpose without departing from the scope of protection of the attached claims.

As mentioned above, when the obstructer 53 rests against the inlet port 52' (FIG. 8A) the working fluid is forced to flow from the compartment 18 to the compartment 19 through a suitable hydraulic circuit, which may be variously configured. For example, depending on the configuration of the hinge 1, the hydraulic circuit may be defined by the calibrated hole 36 (as for example in FIG. 1) and/or by a through-flow obtained in a per se known manner in the hinge body 10 (as for example in FIG. 3) and/or through the duct 61 obtained in the plunger element 30 (such as for example in FIGS. 4 to 5B).

Figure 7:
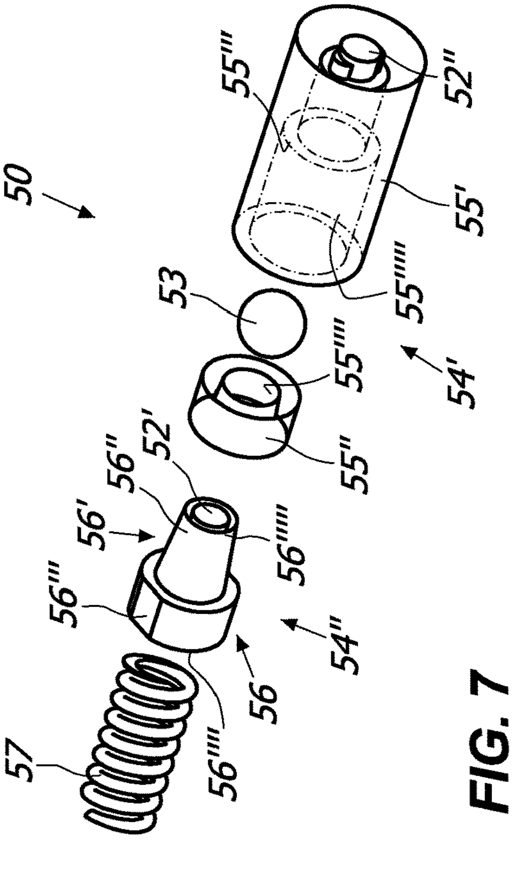
FIG. 7 is an exploded view of a further embodiment of the hinge 1.
Figure 8C:
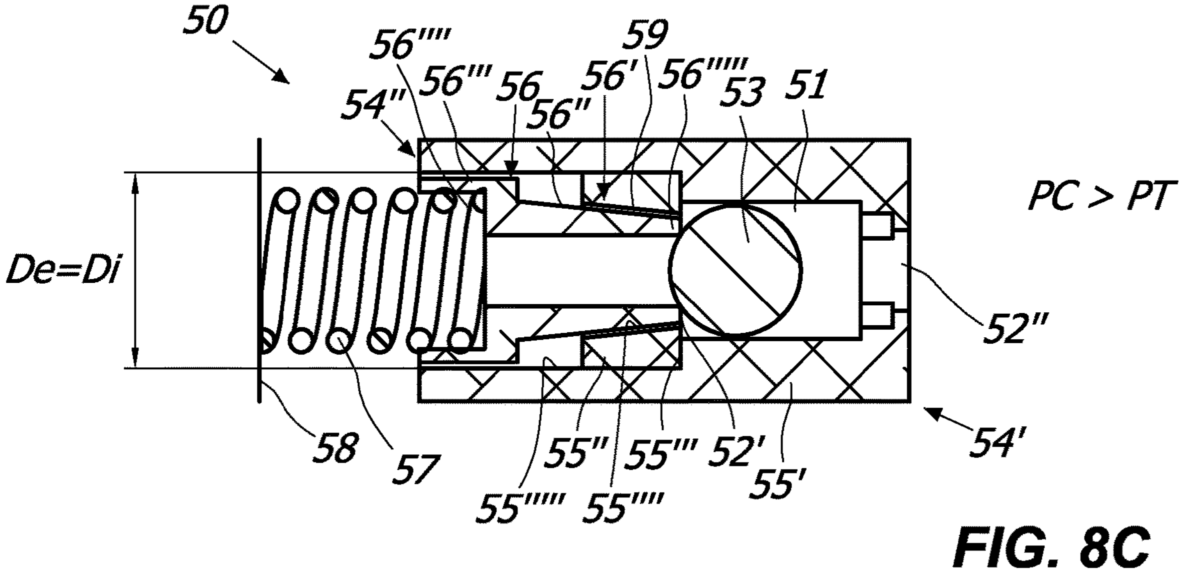
Figure 9:
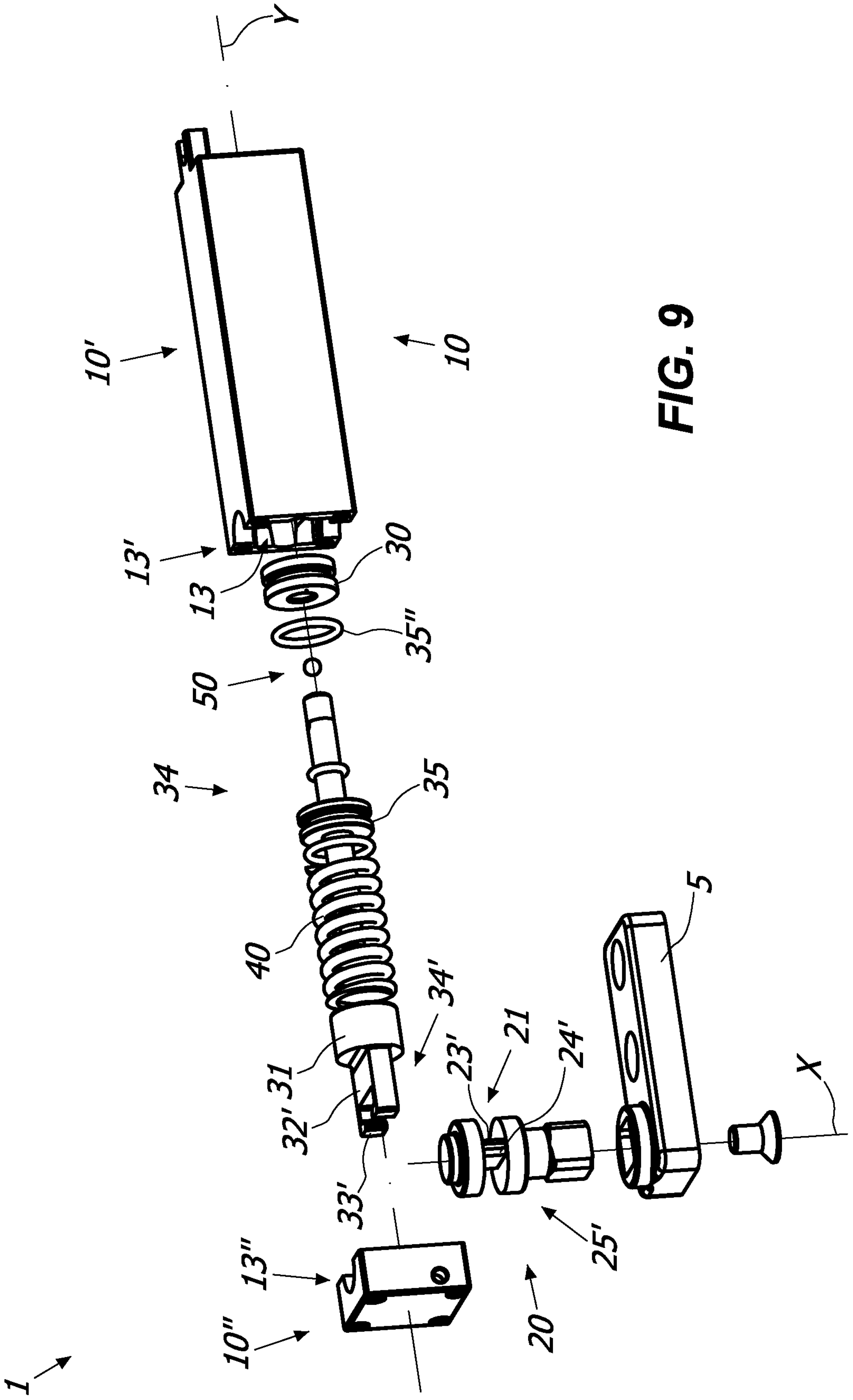
FIG. 9 is an exploded view of a further embodiment of the hinge 1.
Figure 10A:
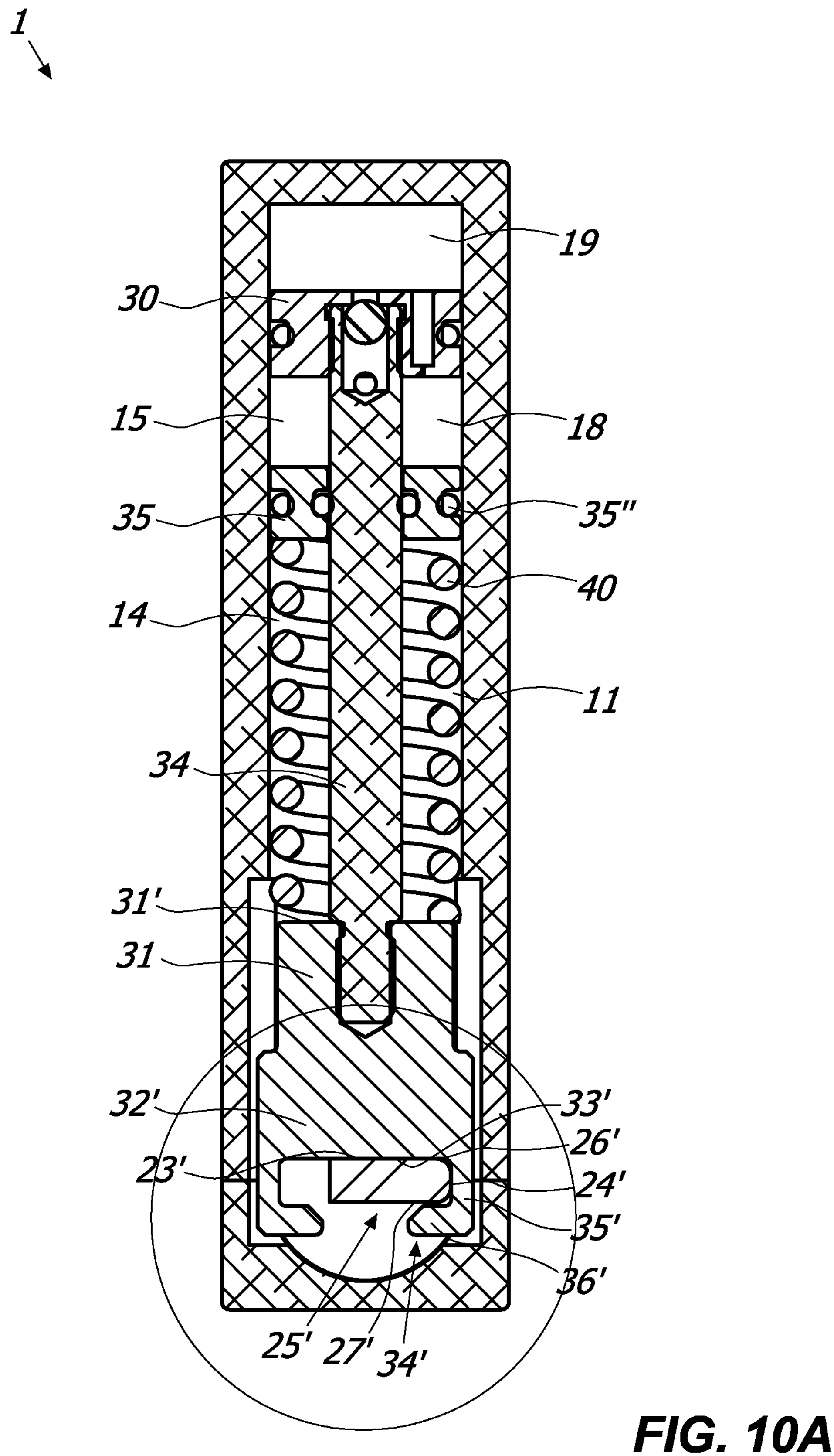
FIGS. 10A, 11A and 12A are sectional views of the embodiment of the hinge 1 of FIG. 9 respectively in closed, intermediate and open position, with FIGS. 10B, 11B and 12B respectively showing some enlarged details.
Figure 10B:
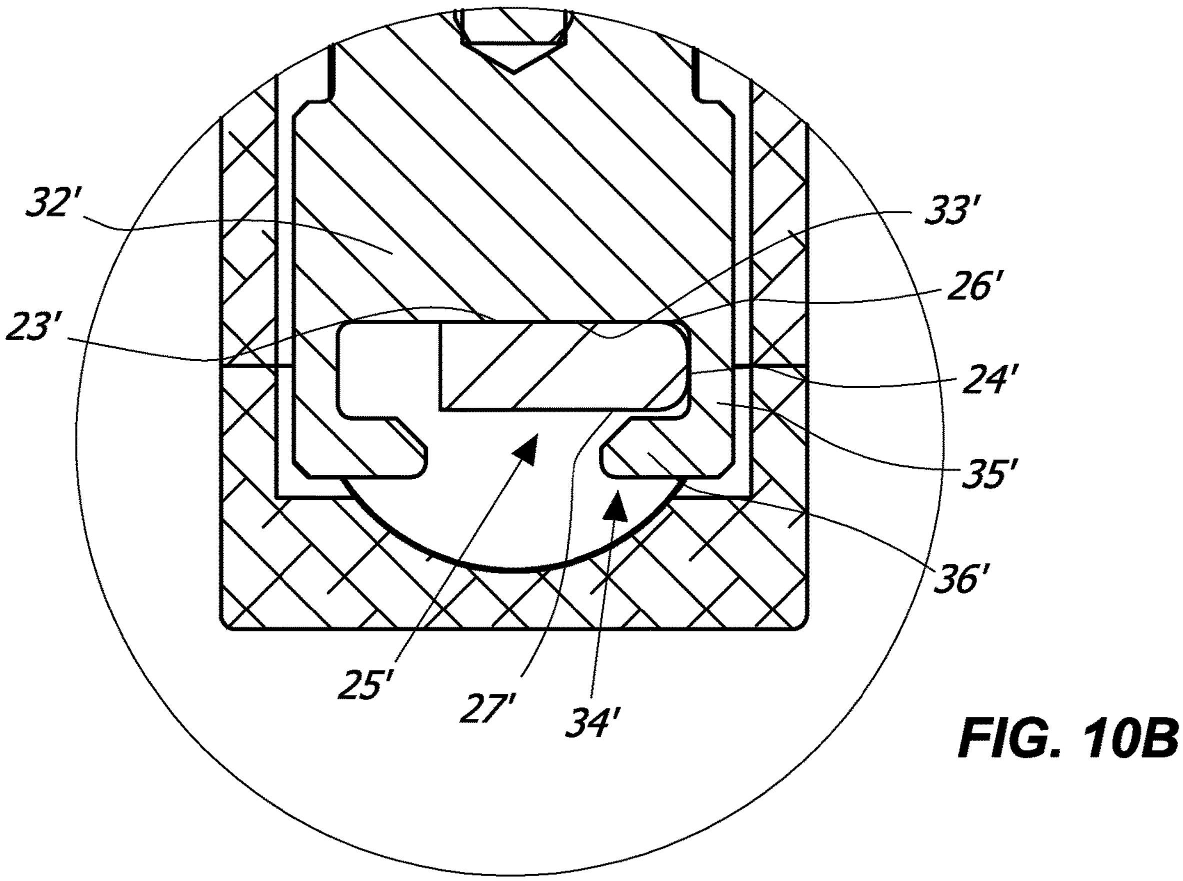

In a preferred but non-exclusive embodiment, illustrated for example in FIGS. 7 to 8C, the working chamber 51 may provide for a fixed portion 54' and movable portion 54" including the inlet port 52'.

For example, the fixed portion 54' of the operative chamber 51 may be formed by a substantially cylindrical body 55' including the discharge port 52" and by an annular body 55" resting against an abutment surface 55'" of the substantially cylindrical body 55'. The annular body 55" may include a substantially frusto-conical inner engagement surface 55"".

On the other hand, the movable portion 54" of the operative chamber 51 may be formed by a shaped body 56 having a front portion 56' with a substantially frusto-conical outer engagement surface 56" and a second substantially annular portion 56'" with an outer diameter De substantially equal to the inner diameter Di of the inner wall 55'"" of the cylindrical body 55'. Thanks to such characteristic, the shaped body 56 may slide along the axis Y.

The shaped body 56 may also include an end seat 56"" for elastic counteracting means, for example a spring 57 arranged abutting against an abutment surface 58. The inlet port 52' may be arranged at the constricted end 56'"" of the front portion 56' of the shaped body 56.

Such elastic counteracting means 57 are suitable to normally push the movable portion 54" of the operative chamber 51 against the fixed portion 54', so as to cause the sealing engagement of the outer engagement surface 56" of the front portion 56' of the shaped body 56 and the substantially frusto-conical inner engagement surface 55"" of the annular body 55" by contact.

The elastic counteracting means 57 may advantageously be calibrated to be compressed when the pressure PC in the operative chamber 51 exceeds a predetermined threshold value PT, as for example illustrated in FIG. 8C, so as to allow the through-flow of the working fluid in the tubular interspace 59 between the fixed and movable portions 54', 54" of the operative chamber 51 even when said through-flow port is closed. The tubular interspace 59 is defined between the outer engagement surface 56" of the front portion 56' of the shaped body 56 and the substantially frusto-conical inner engagement surface 55"" of the annular body 55".

In other words, when the pressure PC in the operative chamber 51 exceeds the predetermined threshold value PT, the shaped body 56—which is normally in engagement position against the annular element 55'—slides along the axis Y being disengaged from the latter to define the tubular interspace 59.

This allows preventing the shutter D from being unhinged by a user who forces the opening and/or closing thereof.

As a matter of fact, in this case the pressure inside the operative chamber 51 would so high that it would put the wholeness of the shutter D itself in jeopardy, given that the back-flow circuit of the working fluid has a limited through-flow section in any case.

On the contrary, in light of the above, the operative chamber 51 acts as an actual overpressure relief valve, so that the working fluid can flow back through the back-flow circuit and through the tubular interspace 59, thus maintaining the shutter D intact.

It is clear that the operative chamber 51 may be variously configured, as long as it includes at least one fixed portion and at least one movable portion, without departing from the scope of protection of the attached claims.

Figure 6:
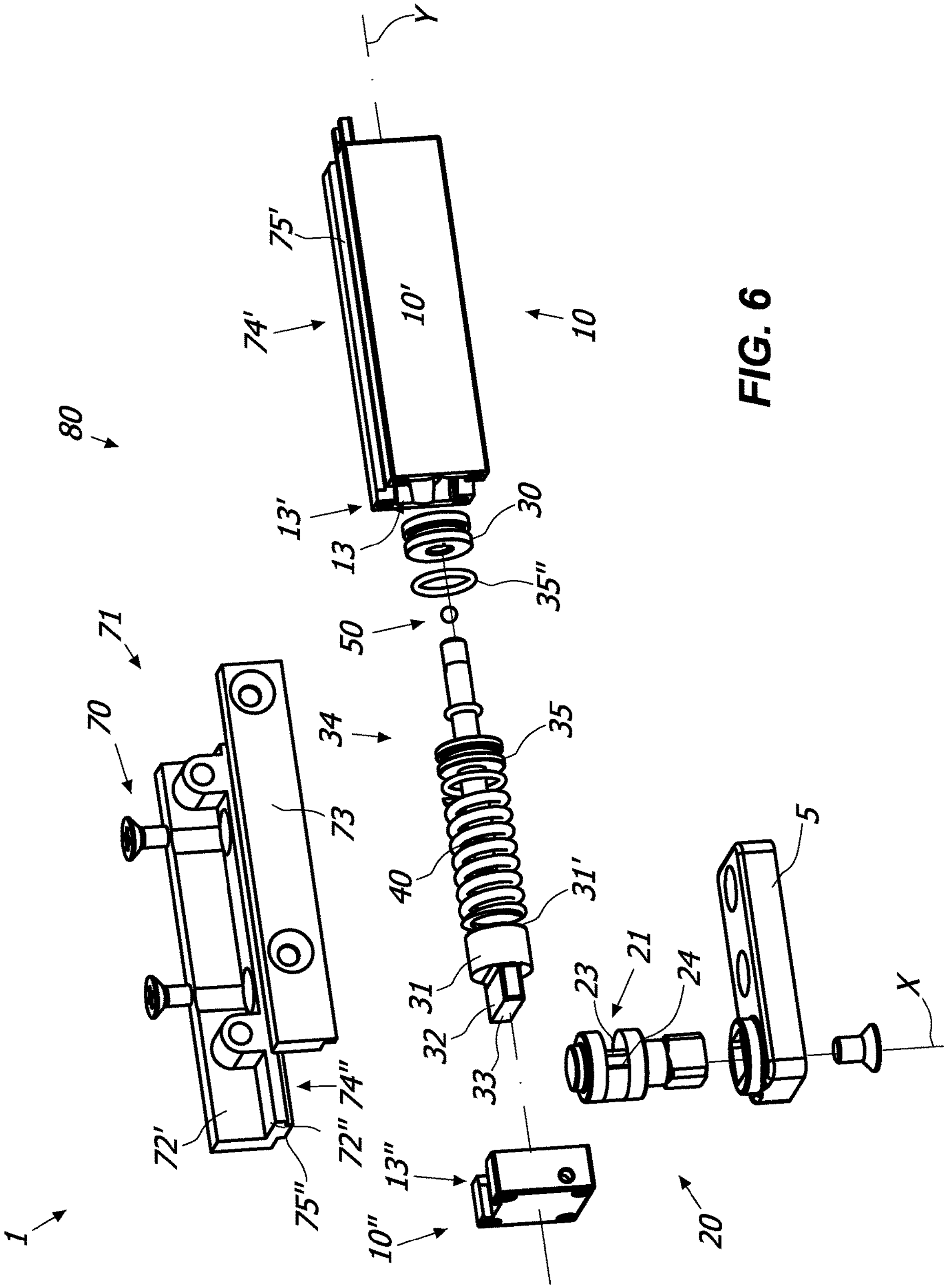
FIG. 6 is an exploded view of another embodiment of the hinge 1.

In a preferred but non-exclusive embodiment, illustrated for example in FIG. 6, the hinge body 10 may be mutually removably couplable, for example through screw and nut screw means 70 acting in a direction substantially perpendicular to the axis Y, with a fixing accessory 71 suitable to fix the shutter D.

The fixing accessory 71 may include a plate-shaped fixing element 72' suitable to cooperate with a corresponding plate-shaped fixing element 73 to fix the shutter D on opposite sides, so that the plane of the latter is substantially parallel or coincident with the plane of the unitary assembly 80 formed by the hinge body 10 and the fixing accessory 71.

The fixing accessory 71 may also include a monolithic connecting plate 72", i.e. made in a single body with the plate-shaped fixing element 72' and it is substantially perpendicular thereto, which may cooperate with screw and nut screw means 70 for mechanically connecting the plate-shaped fixing element 72' and the hinge body 10.

Once connected, the upper surface 74' of the box-shaped hinge body 10 may be faced to and preferably at contact with the lower surface 74" of the connecting plate 72". The surfaces 74" and 74' may suitably be substantially coextensive, so that a substantial structural continuity and a unitary assembly 80 is created between the box-shaped hinge body 10 and the fixing accessory 71.

A longitudinal appendage 75" that can be inserted into a corresponding counter-shaped longitudinal seat 75' of the upper surface 74' of the box-shaped hinge body 10, may suitably extend from the lower surface 74" of the connecting plate 72". The longitudinal appendage 75" and the counter-shaped longitudinal seat 75' may be substantially parallel to each other and to the axis Y. This allows guaranteeing the mutual centring between the box-shaped hinge body 10 and the fixing accessory 71.

Thanks to the above, the hinge 1 may be used alone or with the fixing accessory 71 and the plate-shaped fixing element 73.

Figure 13A:
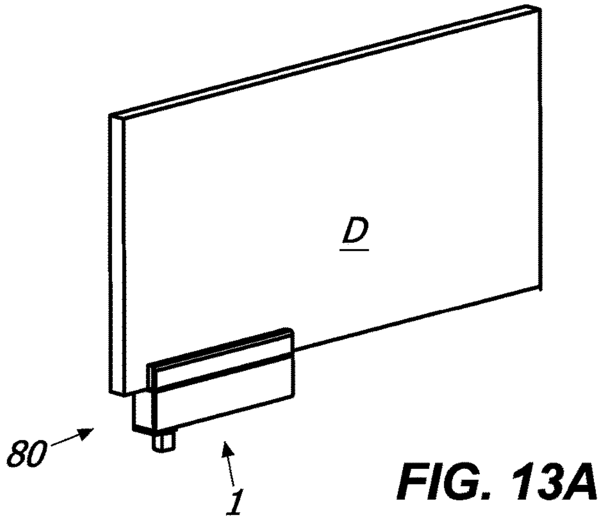
FIGS. 13A and 13B are an axonometric view and front schematic view of an embodiment of a hinge 1 with the fixing accessory 71.
Figure 13B:
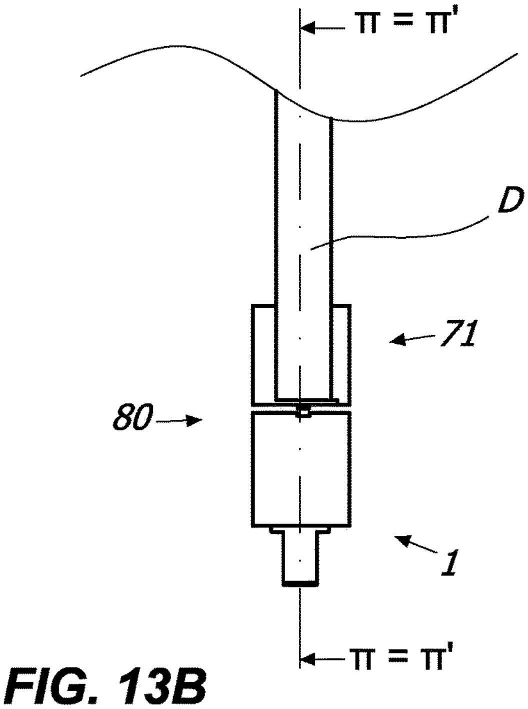
Figure 14:
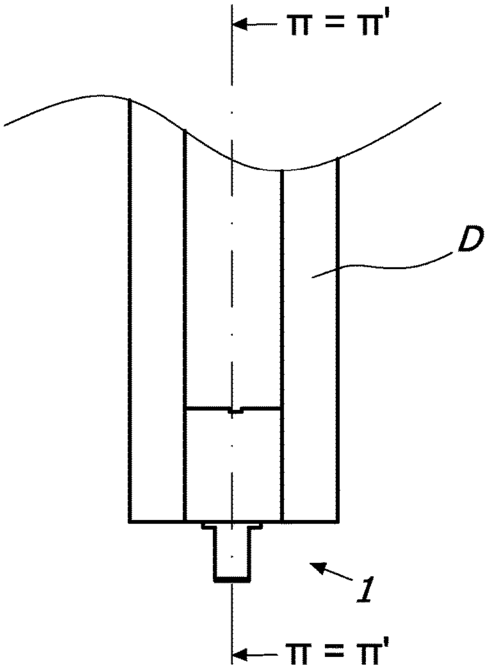
FIG. 14 is a front schematic view of an embodiment of a hinge 1 inserted into a double glazing.
Figure 15A:
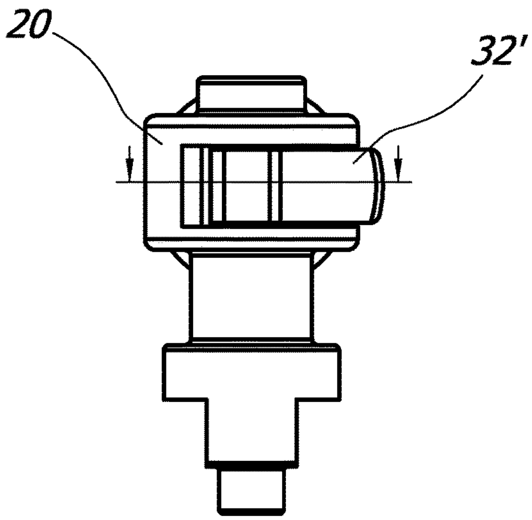
FIGS. 15A and 16A are respectively front and sectional views of a further coupling between cam means 21 and cam follower means 32' in a door-closed position.
Figure 15B:
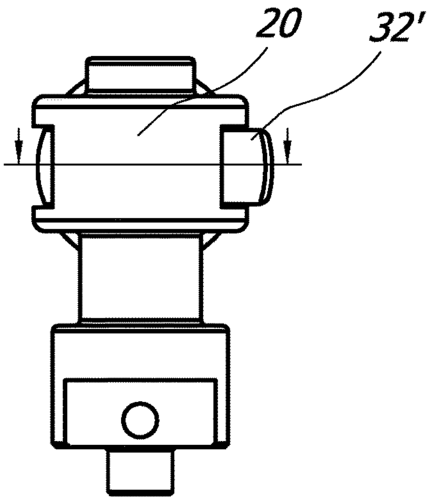
FIGS. 15B and 16B are respectively front and sectional views of the coupling between cam means 21 and cam follower means 32' of the preceding figures in a door-open position.
Figure 16A:
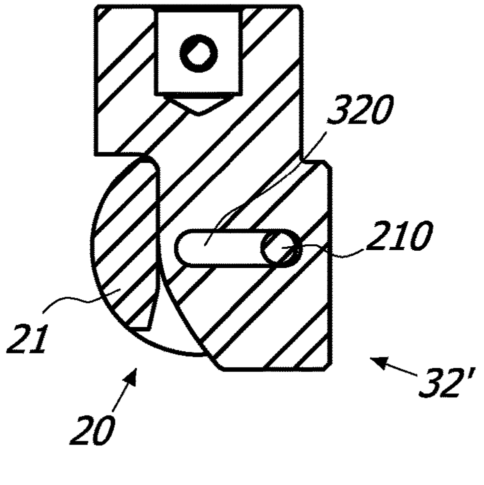
Figure 16B:
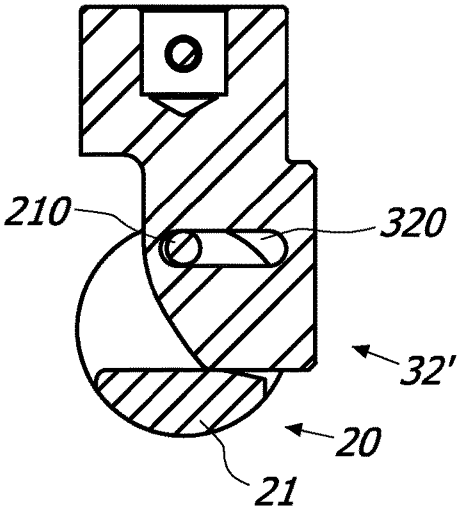

For example, the hinge 1 may be dimensioned so that it can be concealably inserted into the tubular frame of a double glazing or a glass shutter when used alone as for example illustrated in FIG. 14. In addition, when used in combination with the fixing accessory 71 and the plate-shaped fixing element 73, the hinge may fix the glass shutter on opposite sides, as illustrated for example in FIG. 13B.

In light of the above, it is clear that the hinge according to the invention attains the pre-set objectives.

The hinge according to the invention is susceptible to numerous modifications and variants all falling within the inventive concept outlined in the attached claims. All details can be replaced by other technically equivalent elements, and the materials can be different depending on the technical needs, without departing from the scope of protection of the invention.

Even though the hinge has been described with reference to the attached figures, the reference numbers utilised in the description and in the claims, are meant for improving the intelligibility of the invention and thus do not limit the claimed scope of protection in any manner whatsoever.

The invention claimed is:

1. A hydraulic hinge for rotatable movement of a closing element between at least one closing position and at least one opening position, the closing element being adapted to be anchored to a stationary support structure, the hydraulic hinge comprising:

a fixed element adapted to be anchored to the stationary support structure; and a movable element adapted to be anchored to the closing element, said fixed element and said movable element being coupled so that the movable element rotates with respect to the fixed element around a first longitudinal axis;

wherein one of said fixed element or said movable element includes at least one working chamber defining a second longitudinal axis, said at least one working chamber being divided into at least one first half-chamber and at least one second half-chamber separated from each other by at least one hydraulic sealing element, so that a working fluid lies exclusively in one of said at least one first half-chamber or said at least one second half-chamber, the other one of said at least one first half-chamber or said at least one second half-chamber including a counteracting spring, and wherein said one of said at least one first half-chamber or said at least one second half-chamber includes:

a plunger slidable along said second axis, and the working fluid for hydraulically damping a movement of said movable element, wherein said plunger partitions said one of said at least one first half-chamber or at least one second half-chamber into at least a first and a second variable volume compartments placed in fluid communication with each other, wherein said at least one working chamber further comprises at least one shaft having a first end operatively coupled to the other one of said fixed element or said movable element and a second end operatively fixed to said plunger to slide integrally therewith, wherein said other one of said at least one first half-chamber or said at least one second half-chamber is proximal to said first longitudinal axis, said one of said at least one first half-chamber or said at least one second half-chamber being distal from said first longitudinal axis, wherein said at least one hydraulic sealing element is slidably inserted into said a least one working chamber, said counteracting spring acting thereon to push said at least one hydraulic sealing element against said working fluid, wherein said at least one shaft is arranged in said first half-chamber and said second half-chamber passing through said at least one hydraulic sealing element to slide with respect to said at least one hydraulic sealing element, said plunger including a valve controlling the working fluid flow between said first variable volume compartment and said second variable volume compartment, wherein the other one of said fixed element or said movable element includes a cam, said one of said fixed element or said movable element including a cylinder coupled to one end of said at least one shaft, said plunger being disposed at an opposite end of said at least one shaft, and wherein said counteracting spring extends between a rear wall of said cylinder and said at least one hydraulic sealing element, said cylinder integral with an appendage in contact with said cam so that a rotation of said movable element causes a reciprocal interaction of said appendage and said cam and simultaneously causes the sliding of said plunger along said second axis and a compression or an expansion of said counteracting spring.

2. The hydraulic hinge according to claim 1, wherein said at least one hydraulic sealing element is substantially disc-shaped with a maximum outer diameter substantially equal to or slightly larger than an inner diameter of said at least one working chamber.

3. The hydraulic hinge according to claim 1, wherein said at least one hydraulic sealing element includes an elastomeric annular peripheral sealing element adapted to come into contact with an inner wall of said at least one working chamber.

4. The hydraulic hinge according to claim 1, wherein said counteracting spring is a spiral spring fitted onto said at least one shaft having a first end in contact with said at least one hydraulic sealing element and a second end in contact with said rear wall of said cylinder.

5. The hydraulic hinge according to claim 1, wherein upon an occurrence of one of an opening or a closing of the closing element, the working fluid flows from one of said first variable volume compartment or said second variable volume compartment to the other one of said first variable volume compartment or said second variable volume compartment, and upon the occurrence of the other one of the opening or the closing of the closing element, the working fluid flows from the other one of said first variable volume compartment or said second variable volume compartment to said one of said first variable volume compartment or said second variable volume compartment.

* * * * *